United States Patent
Haehnle

(10) Patent No.: US 10,802,806 B1
(45) Date of Patent: Oct. 13, 2020

(54) GENERATING VECTORIZED CONTROL FLOW USING RECONVERGING CONTROL FLOW GRAPHS

(71) Applicant: Advanced Micro Devices, Inc., Santa Clara, CA (US)

(72) Inventor: Nicolai Haehnle, Munich (DE)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 16/370,079

(22) Filed: Mar. 29, 2019

(51) Int. Cl.
*G06F 9/45* (2006.01)
*G06F 8/41* (2018.01)
*G06F 8/30* (2018.01)
*G06F 16/951* (2019.01)
*G06F 16/901* (2019.01)

(52) U.S. Cl.
CPC .......... *G06F 8/433* (2013.01); *G06F 8/30* (2013.01); *G06F 8/43* (2013.01); *G06F 8/443* (2013.01); *G06F 16/951* (2019.01); *G06F 8/452* (2013.01); *G06F 16/9024* (2019.01)

(58) Field of Classification Search
CPC ...... G06F 9/30098; G06F 8/433; G06F 8/456; G06F 16/9024; G06F 8/443; G06F 8/43; G06F 8/452; G06F 8/30; G06F 16/951
See application file for complete search history.

(56) References Cited

U.S. PATENT DOCUMENTS

| | | | | |
|---|---|---|---|---|
| 5,659,754 | A * | 8/1997 | Grove | G06F 8/433 717/146 |
| 2008/0028380 | A1* | 1/2008 | Guo | G06F 8/433 717/151 |
| 2009/0217248 | A1* | 8/2009 | Bently | G06F 8/30 717/132 |
| 2013/0166886 | A1* | 6/2013 | Sasanka | G06F 9/30098 712/216 |
| 2015/0205590 | A1* | 7/2015 | Sabne | G06F 8/456 717/150 |
| 2016/0306805 | A1* | 10/2016 | Cui | G06F 16/951 |

* cited by examiner

*Primary Examiner* — Tuan A Vu
(74) *Attorney, Agent, or Firm* — Liang & Cheng, PC

(57) ABSTRACT

A reconverging control flow graph is generated by receiving an input control flow graph including a plurality of basic code blocks, determining an order of the basic code blocks, and traversing the input control flow graph. The input control flow graph is traversed by, for each basic code block B of the plurality of basic code blocks, according to the determined order of the basic code blocks, visiting the basic code block B prior to visiting a subsequent block C of the plurality of basic code blocks, and based on determining that the basic code block B has a prior block A and that the prior block A has an open edge AC to the subsequent block C, in the reconverging control flow graph, creating an edge AF between the prior block A and a flow block F1, and creating an edge FC between the flow block F1 and the subsequent block C.

20 Claims, 20 Drawing Sheets

GENERATING VECTORIZED CONTROL FLOW USING RECONVERGING CONTROL FLOW GRAPHS

BACKGROUND

Compilers convert program code written in higher-level programming languages to a set of instructions in a target language (e.g., assembly language, object code, machine code, etc.) that can be executed by a processor. During the compiling process, an intermediate representation (IR) of the source program code is used internally by the compiler for tasks such as optimization and translation. Ideally, an IR represents the original source code without loss of information, and is independent of the source language and the target language. One type of IR is generated by transforming the original source code of the program into a graph structure that allows the program control flow to be analyzed and optimized prior to being converted to a sequence of machine-executable instructions. Compilers using the IR in this way are able to generate the IR from a variety of different source languages, and to generate, from the IR, the compiled executable instructions for many different target architectures.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

Program source code (e.g., for a shader, compute kernel, etc.) provided to a compiler typically expresses control flow for individual threads of computation. However, a number of execution models for modern central processing unit (CPU) and graphics processing unit (GPU) target architectures control program flow for waves of threads when executing the program (e.g., execution models that utilize a CPU's single-instruction multiple data (SIMD) units), where each wave includes multiple concurrently executed threads that might diverge (i.e., follow different paths through the original program) during execution of the program. Accordingly, a typical control flow graph representing the original program and branch instructions in the graph are transformed as part of the compilation process so that they express the control flow of entire waves.

Figure 1:
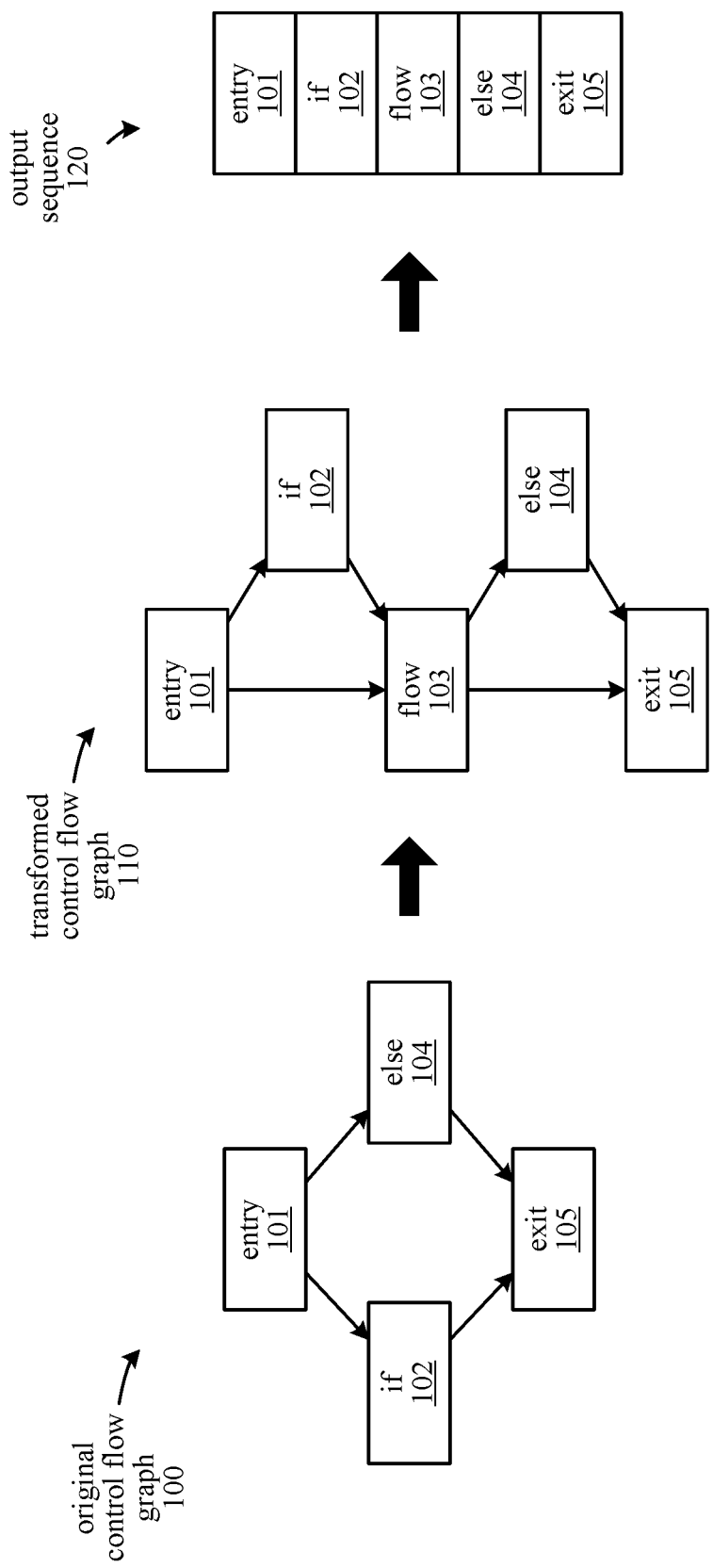
FIG. 1 illustrates a transformation of a control flow graph, according to an embodiment.

FIG. 1 illustrates such a transformation of a program with a single if-else statement, according to an embodiment. The original control flow graph 100 is generated from the program source code, and includes the following basic blocks: an entry block 101, an 'if' block 102 (including code to be executed when a condition is true), an 'else' block 104 (to be executed when the condition is not true), and an exit block 105. The graph 100 is transformed by the addition of another basic block, flow block 103, as shown in the transformed control flow graph 110. The output sequence 120 shows the resulting order of the basic blocks 101-105 in the compiled output. While this type of transformation allows a graph suited for thread-level flow control (graph 100) to be converted to a graph suited for wave-level control flow (graph 110), a suboptimal transformation process results in the addition of unnecessary flow blocks, leading to increased compile time, execution time, complexity of the compiler output, and/or other effects.

During the compilation process, the control flow graph goes through three stages that correspond to the different control flow graphs (CFGs) illustrated in FIG. 1. In the first stage, the CFG 100 reflects the control flow of threads. In the second stage, the CFG 110 reflects the control flow of both threads and waves. In the third stage, the CFG 120 reflects only the control flow of waves. One embodiment of an approach for transforming a CFG facilitates the transition from the first stage to the second stage. In contrast with the original CFG 100, a wave in the transformed CFG 110 passes through both the 'if' and the 'else' block if the threads in the wave diverge. In a properly transformed CFG, when threads in a wave diverge, any diverging threads can be rejoined with the wave at a subsequent block. Accordingly, one embodiment of an approach for transforming a control flow graph involves conforming the control flow graph to a reconverging graph structure.

A CFG is reconverging if every non-uniform terminator T in the CFG has exactly two successors, one of which post-dominates T. Each basic block in a control flow graph ends with a terminator; a non-uniform terminator is a conditional branch instruction indicating two alternative successors that are selected based on a condition. If the condition is not necessarily the same for all threads, the terminator is non-uniform. The post-dominating successor is the primary successor, which means that all paths from the non-uniform terminator T to the exit pass through the primary successor. According to this definition, whenever threads diverge in a reconverging CFG (which only happens at non-uniform terminators), the wave will first branch to the secondary successor. The presence of a post-dominating primary successor guarantees that the threads not branching to the secondary successor have an opportunity to rejoin the wave at the primary successor.

In the transformed graph 110, entry block 101 is terminated by a non-uniform terminator that branches to either the 'if' block 102 or the flow block 103. The flow block 103 is the primary successor because it post-dominates the entry block 101, and the 'if' block 102 is the secondary successor. Any threads not branching to the 'if' block 102 are able to rejoin the wave at the flow block 103.

An input CFG is transformed to a reconverging CFG, according to an embodiment, by determining a sequential order for the basic blocks in the input CFG, and traversing the input CFG according to the determined order while transforming the CFG based on a set of rules. Instructions are added to basic blocks in the transformed CFG for generating execution masks indicating which threads in a wave are active in each basic block. In one embodiment, the traversal of the input CFG is performed using an open tree data structure to keep track of which blocks in the input CFG have been visited. In one embodiment, this approach for generating a reconverging CFG does not require the input CFG to be a reducible CFG (in which backward edges and entry points are clearly identifiable in loops). Furthermore, it inserts unnecessary flow blocks in fewer cases, as compared to existing solutions, resulting in decreased compile time and execution time (due to fewer jumps). An excess of flow blocks also leads to a more conservative register liveness analysis, which makes register allocation more difficult and thus increases register pressure; this can be avoided by more closely following the original program flow.

Figure 2:
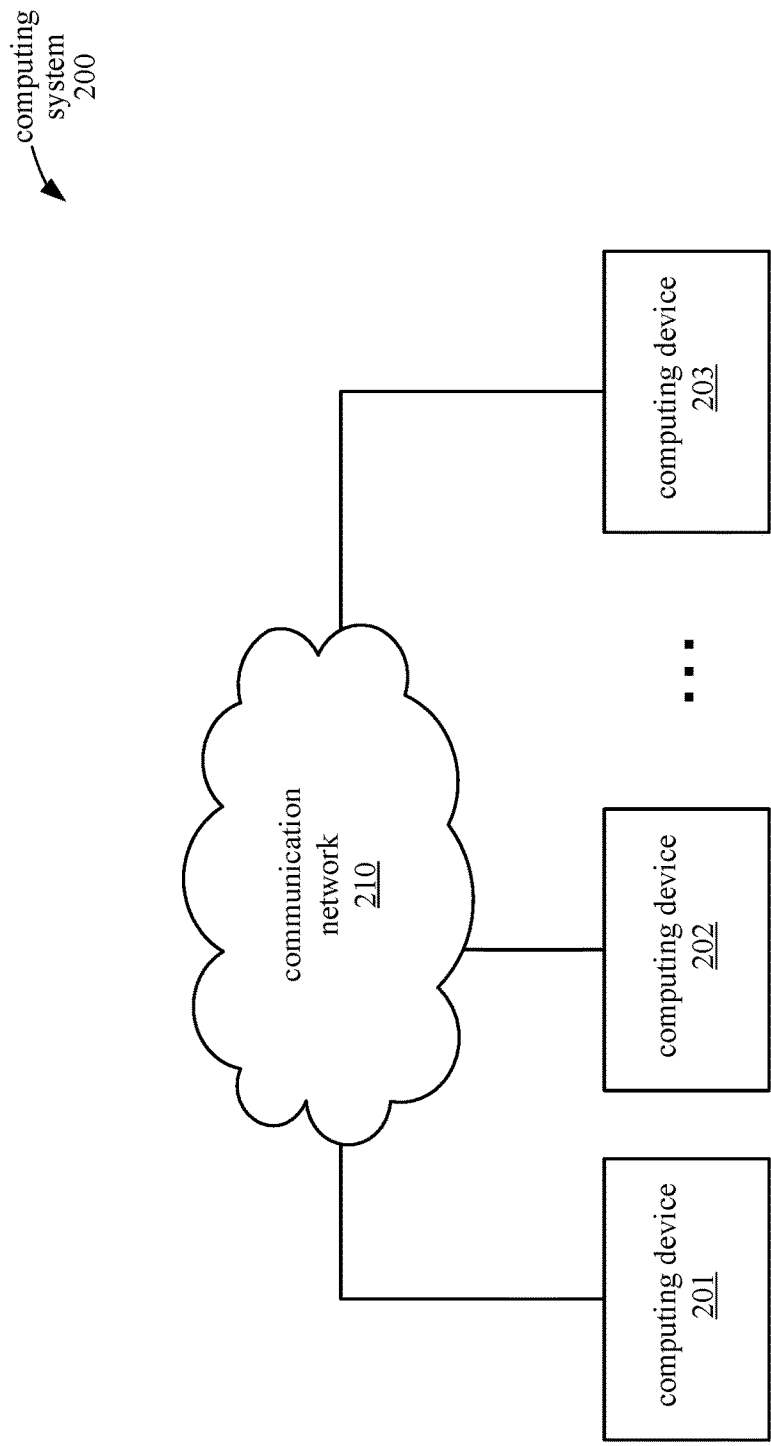
FIG. 2 illustrates a computing system, according to an embodiment.

FIG. 2 illustrates an embodiment of a computing system 200 in which the reconverging CFG generation process is performed. Computing system 200 includes a set of one or more computing devices 201-203 (e.g., NUMA nodes, servers, mobile devices, etc.) that are connected to each other via a communication network 210. Each of the computing devices 201-203 has processing and memory storage capabilities. In one embodiment, the computing system 200 is contained within a single physical enclosure, and the communication network 210 is a bus or system interconnect connecting the computing devices 201-203 within the enclosure. For example, the computing devices 201-203 can include processing units such as GPUs, central processing units (CPUs), field programmable gate arrays (FPGAs), etc. on the same board or on separate carrier boards that are connected to each other via a backplane. In one embodiment, the components in the computing system 200 are contained in separate physical enclosures and are geographically distributed. For example, the computing devices 201-203 can represent individual servers, personal computers, mobile devices, etc. that are connected to each other via a wide-area network (WAN) such as the Internet, a local-area network (LAN), wireless network, or other communication network 210. In one embodiment, the computing devices 201-203 represent the same type or similar types of devices; alternatively, the computing devices 201-203 are different types of devices.

Figure 3:
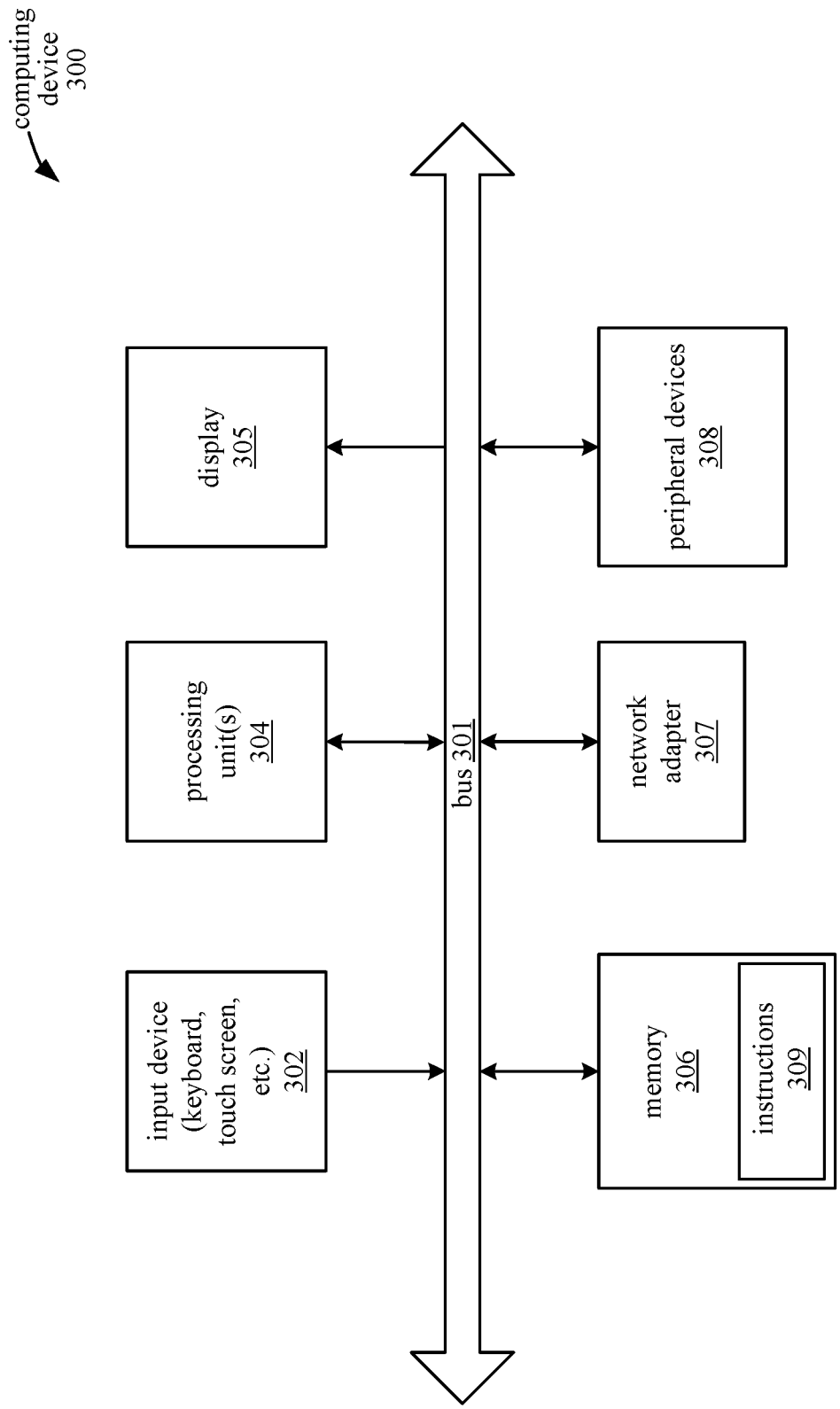
FIG. 3 illustrates a computing device, according to an embodiment.

FIG. 3 illustrates an embodiment of a computing device 300 in which the reconverging CFG generation process is performed. In general, the computing device 300 is embodied as any of a number of different types of devices, including but not limited to a laptop or desktop computer, mobile device, server, etc. The computing device 300 includes a number of components 302-308 that communicate with each other through a bus 301. In computing device 300, each of the components 302-308 is capable of communicating with any of the other components 302-308 either directly through the bus 301, or via one or more of the other components 302-308. The components 301-308 in computing device 300 are contained within a single physical enclosure, such as a laptop or desktop chassis, or a mobile phone casing. In alternative embodiments, some of the components of computing device 300 are embodied as peripheral devices such that the entire computing device 300 does not reside within a single physical enclosure.

The computing device 300 also includes user interface devices for receiving information from or providing information to a user. Specifically, the computing device 300 includes an input device 302, such as a keyboard, mouse, touch-screen, or other device for receiving information from the user. The computing device 300 displays information to the user via a display 305, such as a monitor, light-emitting diode (LED) display, liquid crystal display, or other output device.

Computing device 300 additionally includes a network adapter 307 for transmitting and receiving data over a wired or wireless network. Computing device 300 also includes one or more peripheral devices 308. The peripheral devices 308 may include mass storage devices, location detection devices, sensors, input devices, or other types of devices used by the computing device 300.

Computing device 300 includes one or more processing units 304, which in the case of multiple processing units 304 are capable of operating in parallel. The processing unit(s) 304 are configured to receive and execute instructions 309 that are stored in the memory subsystem 306. In one embodiment, each of the processing unit(s) 304 includes multiple processing cores that reside on a common integrated circuit substrate. Memory subsystem 306 includes memory devices used by the computing device 300, such as random-access memory (RAM) modules, read-only memory (ROM) modules, hard disks, and other non-transitory computer-readable media.

Some embodiments of computing device 300 may include fewer or more components than the embodiment as illustrated in FIG. 3. For example, certain embodiments are implemented without any display 305 or input devices 302. Other embodiments have more than one of a particular component; for example, an embodiment of computing device 300 could have multiple buses 301, network adapters 307, memory devices 306, etc.

In one embodiment, a process of converting an input CFG to a reconverging CFG is performed in three phases. The first phase determines an order for the basic blocks in the input CFG. The second phase traverses the input CFG according to the determined order and performs the transformation by modifying the blocks and edges as they are traversed. The third phase inserts instructions into the added or modified blocks to manage execution masks and rejoining of threads. In the following description, capital letters (e.g., A, B, C, etc.) are used to refer to blocks generally, while lowercase letters (e.g., a, b, c, etc.) are used to refer to specific blocks in the illustrated examples.

Figure 4:
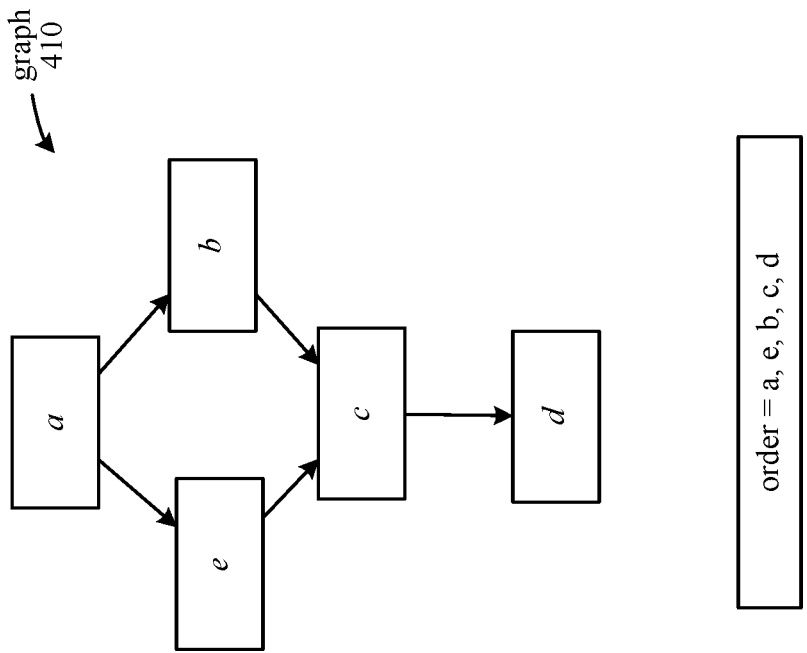
FIG. 4 illustrates calculation of an order for control flow graphs, according to an embodiment.
Figure 4:
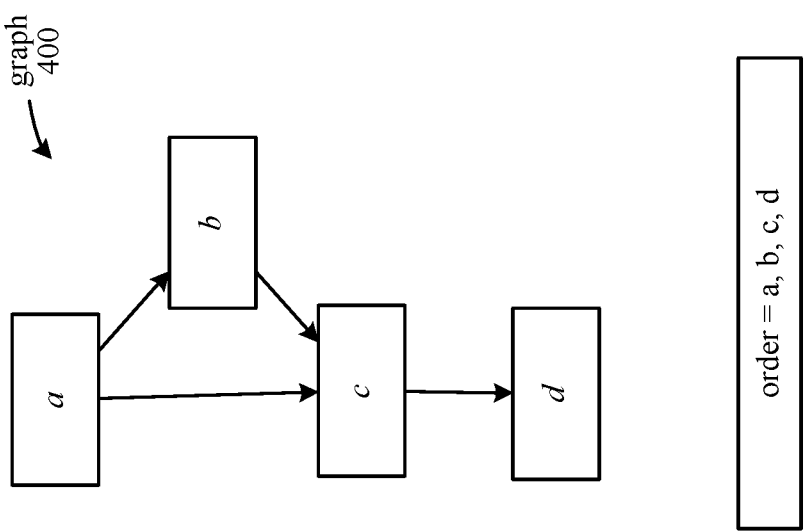

FIG. 4 illustrates two control flow graphs 400 and 410 that are traversed to determine an order of the basic blocks, according to an embodiment. In one embodiment, an order for a given input CFG is determined by traversing the CFG in depth-first order, with some modifications. The traversal order is returned as the determined ordering of the basic blocks. Where B is a basic block currently being visited, the exceptions to the depth-first traversal order are: 1) when there are two successors of block B, visit the successor which is not a post-dominator of B first, and 2) do not traverse an edge E=(B, C) if C is an unvisited successor or post-dominates an unvisited successor of an ancestor of B in the traversal tree.

In FIG. 4, graph 400 has basic blocks a, b, c, and d. When visiting block a, it is determined that block a has two successors that have not yet been visited, blocks b and c. Since block c is a post dominator of the block being visited (i.e., block a), the next block to be visited will be block b. When block b is visited, the next block to be visited will be block c.

Graph 410 illustrates the case when block e is a sibling of block b. Neither of blocks e and b post-dominates the block a that is being visited; therefore, rule 1) does not apply. Instead, both of blocks b and e are post-dominated by block c. From block a, block e is chosen arbitrarily for this example. After visiting block e, edge ec between blocks e and c is skipped according to rule 2) because block c is an unvisited successor or post-dominates an unvisited successor of an ancestor of block e (where e is the block now being visited) in the traversal tree. Here, the ancestor of block e is block a, and block b is the unvisited successor of the ancestor block a.

This modified traversal order will still visit all reachable basic blocks of the CFG. If an edge AB between blocks A and B is skipped due to one of the ordering traversal rules, there is an unvisited successor S of an ancestor P of A through which B can be reached, and the edge PS will still be considered later by the ordering process. The unique exit block of the CFG (e.g., block d in graphs 400 and 410) will be last in the ordering, since it post-dominates all other blocks. The resulting order for graph 400 is (a, b, c, d). The resulting order for graph 410 is (a, e, b, c, d).

After the order of the basic blocks has been determined, the order is used as an input for the second phase, in which the basic blocks and edges are modified. During this phase, a preparatory pass traverses the input CFG and modifies it so that all non-uniform terminators in the CFG have at least one forward edge. Afterwards, an open tree data structure is initialized, and a main transformation pass over the input CFG modifies the basic blocks and edges where appropriate to produce a reconverging output CFG. The blocks are traversed in the determined order while using the open tree to keep track of which basic blocks have been visited and still have unprocessed edges.

The first modifications to the input CFG are done by a preparatory pass that modifies the input CFG so that all non-uniform terminators have at least one forward edge. For each basic block B in the ordering, the preparatory pass proceeds as follows: if block B has a non-uniform terminator and both outgoing edges are backwards, then create a new virtual basic block Y, move the terminator of block B into block Y, and replace the moved terminator with an unconditional branch from block B to block Y. Block Y is then inserted into the order before the successor blocks of block B.

Figure 5:
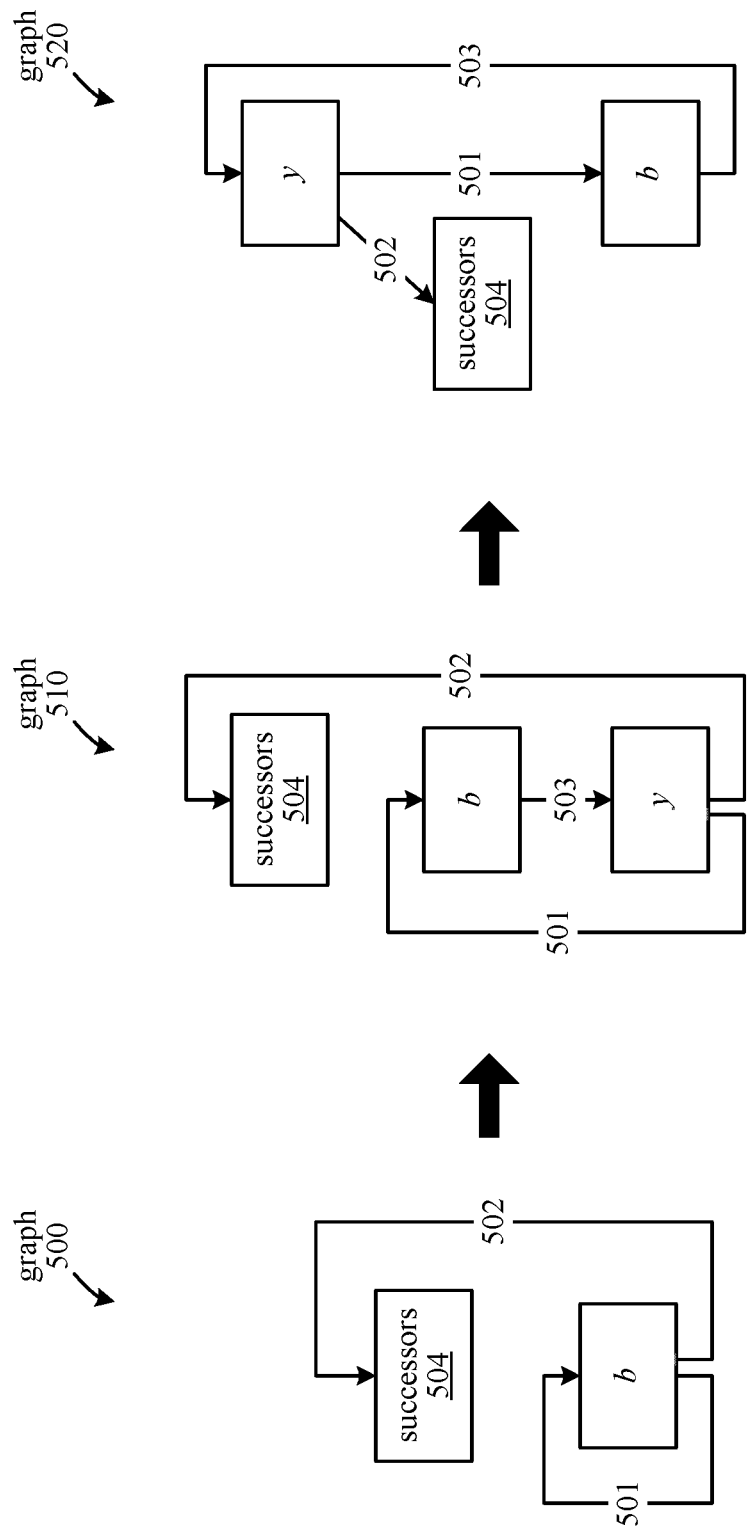
FIG. 5 illustrates a preliminary pass for converting backward edges in a control flow graph, according to an embodiment.

FIG. 5 illustrates this preparatory modification on a graph 500, according to an embodiment. The input graph 500 includes a basic block b with two backward edges 501 and 502. Edge 501 connects block b to itself, and edge 502 connects block b to its successor blocks 504. As shown in graph 510, a new virtual basic block y is created, and the terminator of block b is moved to block y, so that edges 501 and 502 connect block y to the successors 504. A new unconditional branch terminator is added to block b, connecting block b to block y via the new edge 503. As shown in graph 520, the virtual block y is inserted into the order prior to the successor blocks 504 (blocks illustrated higher in the graph are earlier in the order). In the final version of the graph 520, all non-uniform terminators have at least one forward edge; in particular, the only non-uniform terminator is in block y, which has two forward edges.

Figure 6A:
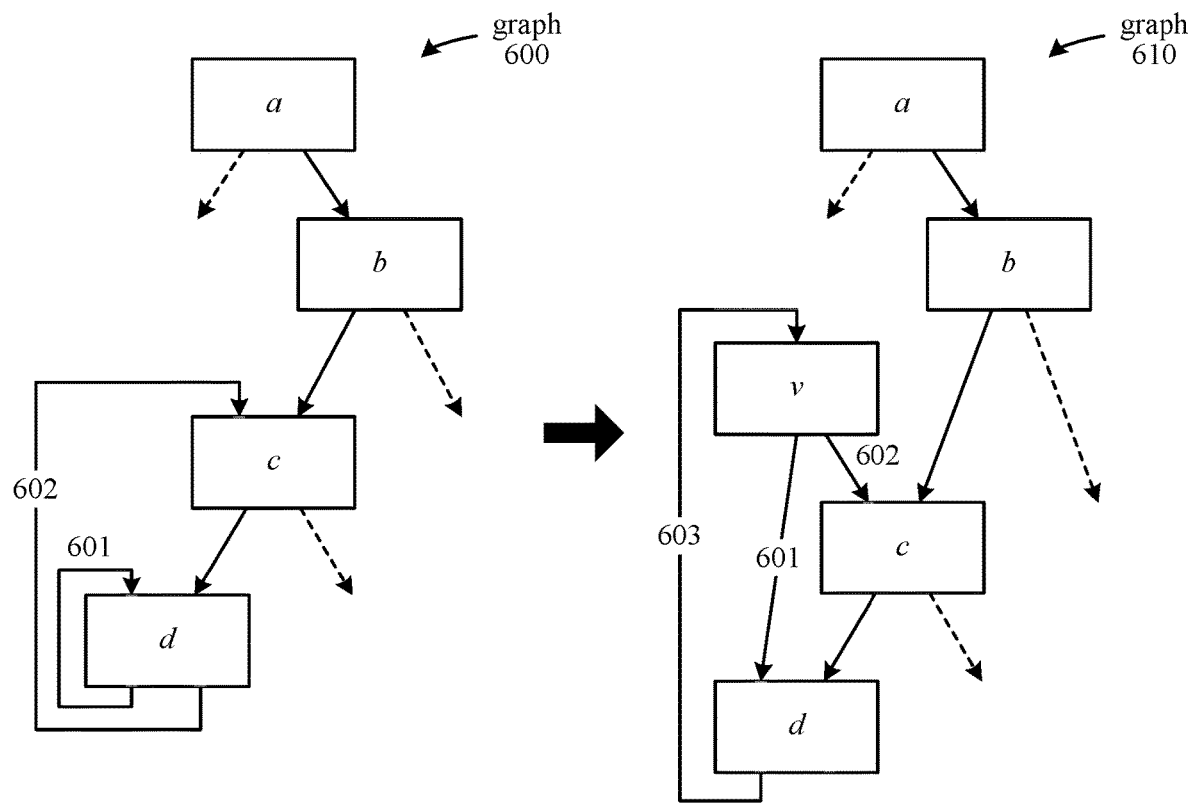
FIG. 6A illustrates the application of a preliminary pass in a control flow graph, according to an embodiment.

FIG. 6A illustrates another example graph 600 in which a block d has two backward edges 601 and 602 from its non-uniform terminator. Accordingly, the preparatory pass creates a new virtual block v and moves the non-uniform terminator from block d to block v. A new edge 603 is created by adding an unconditional branch from block d to block v. Block v is positioned prior to the successor block c in the order. The result is shown as graph 610. Block d has the only backward edge 603, which is not from a non-uniform terminator.

Figure 6B:
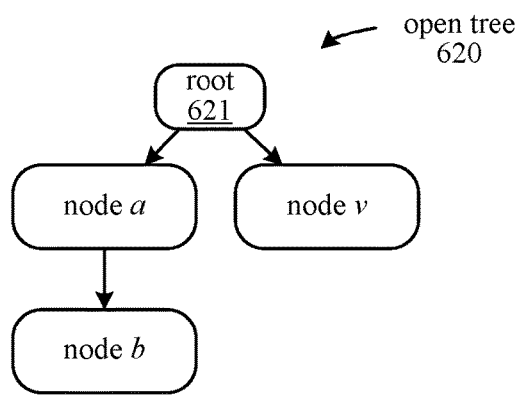
FIG. 6B illustrates an open tree data structure, according to an embodiment.

FIG. 6B illustrates an open tree data structure corresponding to graph 610, according to an embodiment. After the preparatory pass, an open tree data structure is initialized to contain a virtual root node, according to an embodiment. The open tree is a data structure used during the main pass for keeping track of which basic blocks have been visited, but still have an open edge remaining to be processed. The main pass traversal of the CFG maintains the open tree so that, except for the root node, the nodes in the open tree correspond to visited basic blocks that have open edges.

An open edge from an origin block is an edge that connects the origin block to a target block that has not been visited and has not yet been added to the open tree. Open edges can be incoming backward edges or outgoing forward edges, where the backward and forward designations are relative to the ordering of basic blocks. Forward edges are directed to target blocks that are later than their origin blocks in the order, while backward edges are directed to target blocks that are earlier in the order. An edge from a block to itself is considered a backward edge.

In one embodiment, when all edges of a basic block are closed (i.e., the target blocks for all edges originating from the block have been visited), the open tree is reduced by removing the corresponding node N from the open tree, and attaching the child nodes of N to the parent node of N.

The manner by which a basic block B is added to the open tree during the main pass traversal depends on the predecessor blocks of B, if any, that are already in the open tree. Three possibilities are considered: 1) block B has no predecessors in the open tree, 2) block B has a unique lowest predecessor in the open tree, and 3) the lowest predecessors of B in the open tree are not unique.

First, if no predecessor of block B is in the open tree, then a node for block B is added to the open tree as a child of the root node. Referring to FIGS. 6A and 6B, upon visiting block a, it is determined that block a has no predecessors in the open tree 620. Therefore, block a is added to the open tree 620 by adding node a as a child of the root node 621 to represent block a in the open tree 620. The virtual block v that was previously added by the preparatory pass is also added to the open tree 620 as node v. Node v is added as a child of the root node 621 since block v also has no predecessors in the open tree 620.

Second, if one or more predecessors of block B are already in the open tree, the lowest predecessor node is identified, and a node for block B is added as a child of the lowest predecessor. The lowest predecessor of block B is the predecessor that is connected to block B in the CFG via the least number of edges. Continuing the example, after block a is added to the open tree 620, block b is visited. Block b has a lowest unique predecessor (i.e., block a) that has already been added to the open tree 620. Therefore, node b corresponding to block b is added to the open tree 620 as a child of node a.

Figure 6C:
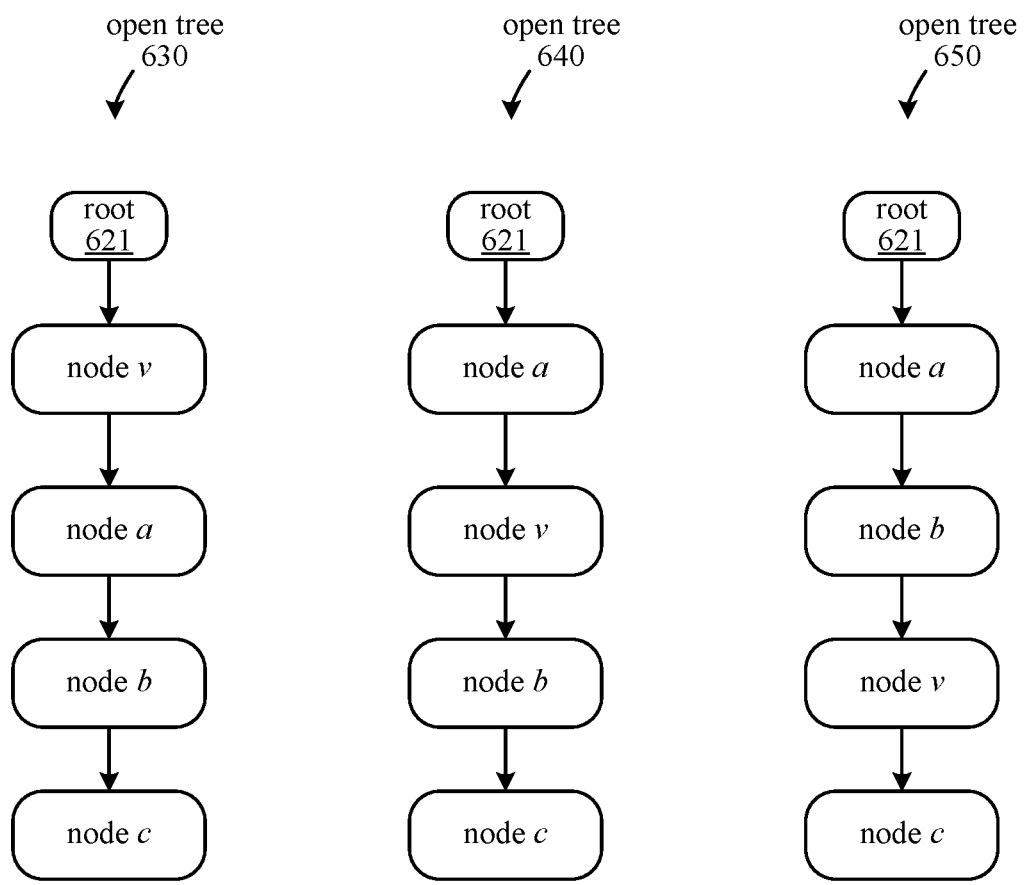
FIG. 6C illustrates possible node orderings for an open tree data structure, according to an embodiment.

Third, if the lowest predecessor is not unique, then all paths leading from the root 621 to the predecessors of block B are collapsed into a single path by interleaving the nodes. Then block B is added to the open tree 620 as a child to the unique lowest predecessor on the resulting path. Continuing the example, after node b is added, block c is visited. However, block c has two predecessors in the graph 610, which are blocks b and v. Both of blocks b and v are connected to block b via a single edge; therefore, neither is uniquely the lowest predecessor of block b. Accordingly, the two paths leading from the root node 621 to the respective nodes b and v are collapsed into a single path that interleaves all the nodes a, b, and v from both paths. FIG. 6C illustrates the three possible open trees 630, 640, and 650 resulting from interleaving the nodes in different orders, according to an embodiment.

In each of the possible orderings 630, 640, and 650, the nodes maintain their relative positions to the other nodes in the same branch. Compared with open tree 650, the open trees 630 and 640 can result in unnecessary complexity when flow blocks are introduced. For example, when block d is added as a child of node c, block v still has open outgoing edges to multiple basic blocks that would be routed through a new flow block. For open trees 630 and 640, the flow block would unnecessarily have block b and possibly also block a as predecessors, leading to an unnecessarily complex CFG.

Thus, in one embodiment, the path collapsing routine places leaves (i.e., nodes without successors) of the branches being collapsed as low as possible above their successors. In open tree 650, the node v is a leaf node and is thus placed as low as possible before its successor node c. An ordering for nodes having the same successors (e.g., nodes b and v both have the same successor node c) is chosen arbitrarily.

In the second phase, the main transformation pass of the CFG adds nodes to the open tree as described above as their corresponding basic blocks are traversed according to the order previously determined in the first phase. In one embodiment, for each basic block B being visited during the traversal, the main transformation pass performs the following operations: 1) identify a set P of armed predecessors of block B, 2) for any subtrees (i.e., portions of the open tree) rooted in P that contain open outgoing edges not leading to B, reroute the open edges through a flow block, 3) add block B to the open tree, and 4) for any targets N of backward edges from B, identify subtrees rooted in N having multiple roots or open outgoing edges to multiple basic blocks and reroute these subtrees through a new flow block.

Figure 7:
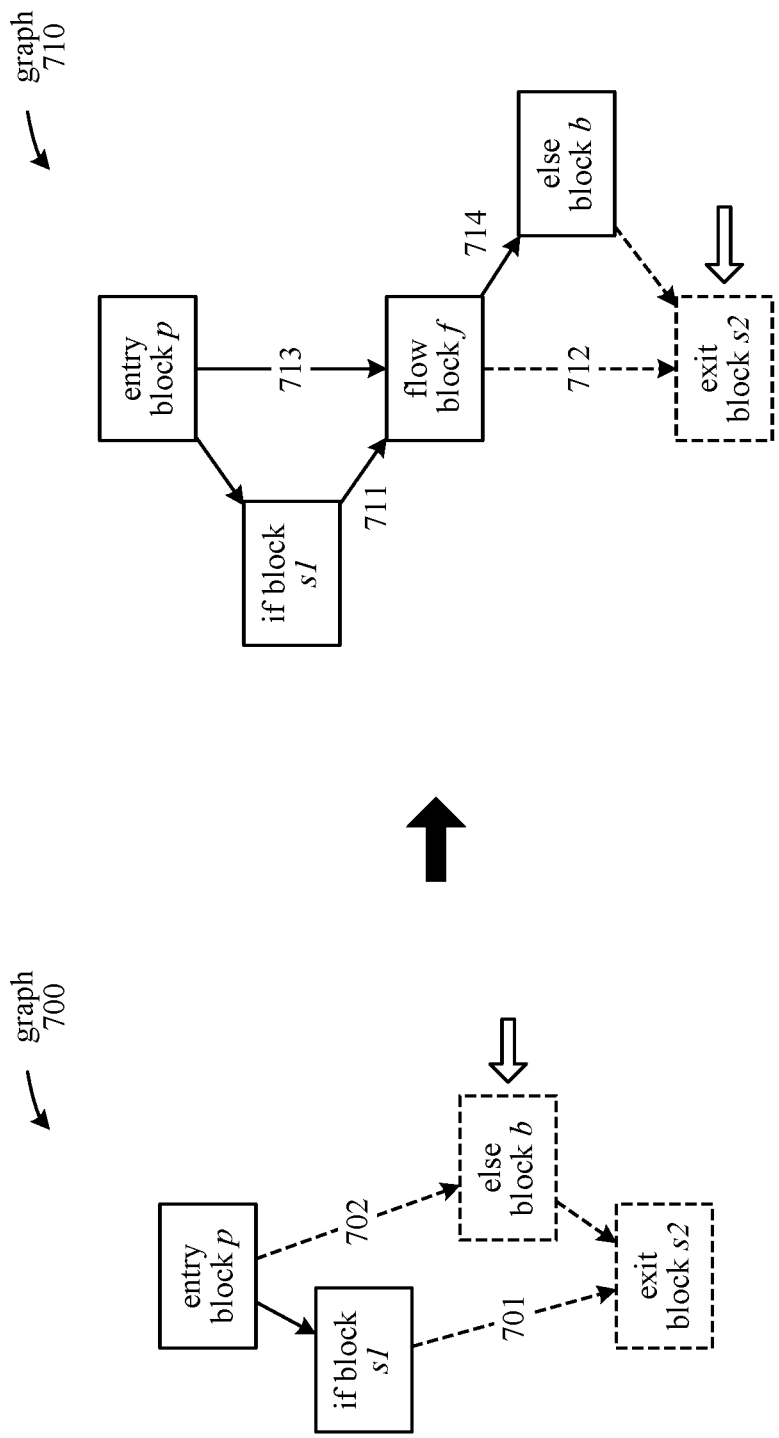
FIG. 7 illustrates rerouting of edges through a flow block in a control flow graph, according to an embodiment.

FIG. 7 illustrates the transformation of a control flow graph 700 into a graph 710 according to the main transformation pass operations 1-3. The input CFG 700 includes an entry block p, an 'if' block s1, an 'else' block b, and an exit block s2. Blocks and edges shown in solid lines have already been visited, while blocks and edges in dashed lines are unvisited or being visited. As illustrated in FIG. 7, block b is currently being visited (as indicated by the unfilled arrow), while blocks p and s1 precede block b in the order and have already been visited and added to the open tree. According to the main pass operation 1) above, the entry block p is an armed predecessor of the currently visited block b. A basic block is armed if it has a non-uniform terminator and one of the outgoing edges of the terminator has already been closed. For block p, the edge to block s1 has already been closed because block s1 has already been visited and added to the open tree.

The main pass then identifies a set of subtrees S rooted at nodes in the set of armed predecessors (i.e., block p). If there are any open outgoing edges in the subtrees S that do not lead to the currently visited block b, the open outgoing edges are routed through a new flow block, according to main pass operation 2). Continuing the example, the subtree including blocks p and s1 is rooted at block p, and has open outgoing edges 701 (connecting block s1 to block s2) and 702 (connecting block p to block b). Therefore, the open edges of this subtree are rerouted through a new flow block f, shown in graph 710.

Rerouting the open outgoing edges of the subtree through a new flow block proceeds by 1) creating a new flow basic block F, 2) for every open outgoing edge AB in the subtree from a block A to a block B, replacing the edge with an edge AF between block A and the flow block F and adding an edge FB between the flow block F and block B if it does not already exist, and 3) adding the flow block F to the open tree. Continuing the above example, the flow block f is created according to the rerouting operation 1). According to the rerouting operation 2), the open edge 701 is replaced with an edge 711 from block s1 to the flow block f, and an edge 712 is added from the flow block f to block s2. Open edge 702 is replaced with an edge 713 from block p to the flow block f, and an edge 714 is added from the flow block f to block b. The new flow block f is added to the open tree, according to the rerouting operation 3).

With reference to graph 700 in the above example, the ordering determines that the wave would go to block s1 first, so the main pass ensures that the other successor of the entry block p is a post-dominator of blocks p and s1. Since block b is not already a post-dominator, the flow block f is added, which post-dominates blocks p and s1. The resulting graph 710 is reconverging. After the addition of a node f (representing the flow block f) to the open tree, the visitation of block b is complete and block b is added to the open tree as a child of the node f Graph 710 shows block b as visited, and block s2 is visited next.

After adding block B to the open tree, operation 4) of the main transformation pass handles backward edges from node B. The main pass identifies a set of target blocks N, which are the targets of backward edges from block B. If any subtrees rooted in N have multiple roots or open outgoing edges to multiple basic blocks, then the subtrees are rerouted through a new flow block.

Figure 8:
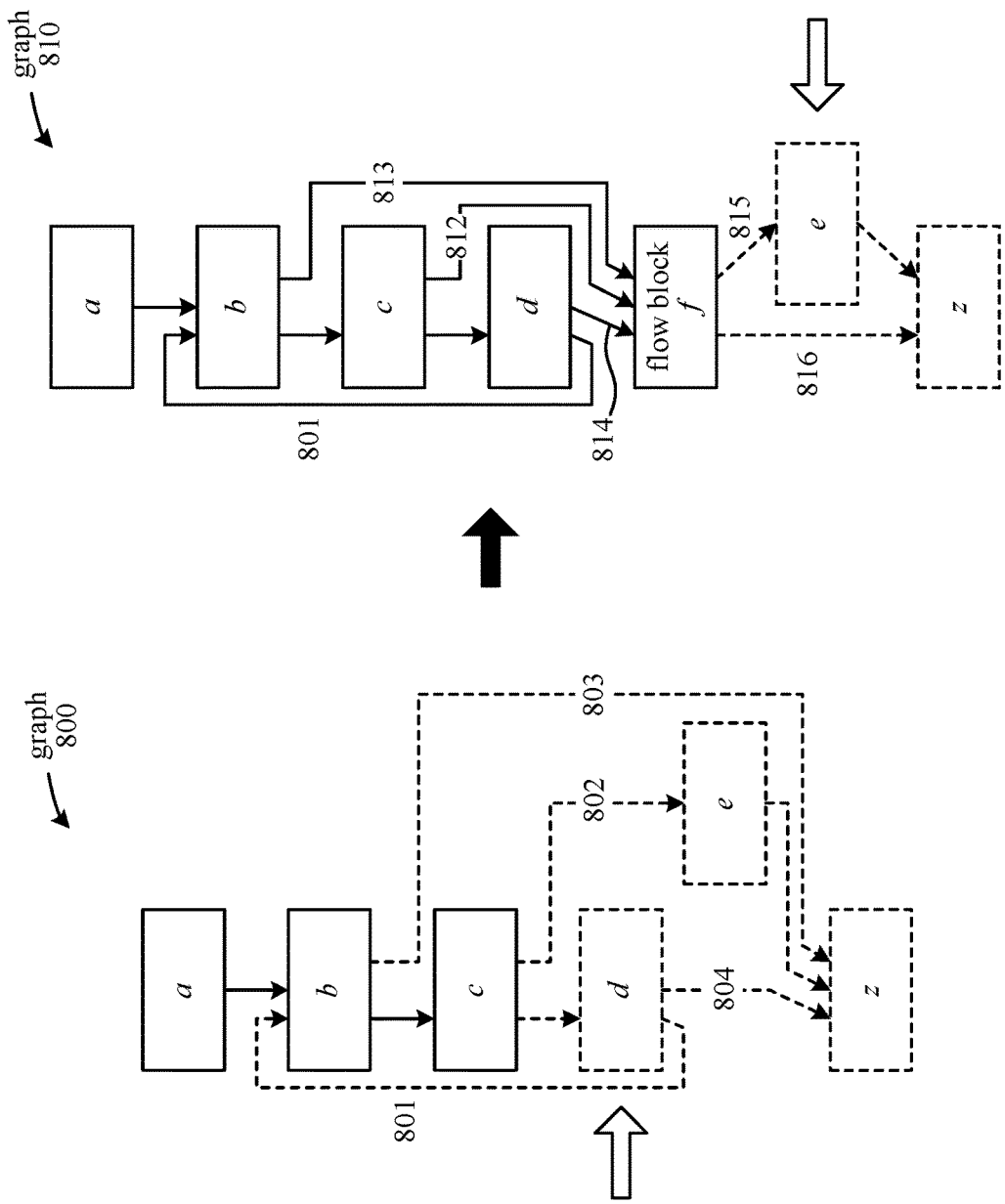
FIG. 8 illustrates rerouting of edges through a flow block in a control flow graph, according to an embodiment.

FIG. 8 illustrates an example showing how a backward edge is handled by the main pass transformation, according to an embodiment. In graph 800, block d is the last block in a loop that includes blocks b, c, and d. One backward edge 801 of block d returns to the successor block b at the beginning of loop. Another edge 804, directed to block z, leaves the loop. Block z will be the post-dominator after the transformation. The loop can be exited (e.g., via a break) from one of the nodes b and c, which could destroy the post domination condition. Thus, the edges 802 and 803 directed to the break targets e and z are rerouted through a new flow block along with the normal exit point (via edge 804) of the loop. This ensures that the resulting graph 810 reconverges.

The basic blocks in graph 800 are ordered as (a, b, c, d, e, z). When block d is visited, the target blocks of the backward edge 801 are identified as blocks b and c. A subtree including blocks b and z and a subtree including blocks c and e are both rooted at target blocks of the backward edge 801. These subtrees represent paths breaking from the loop, and are rerouted through a new flow block f Another subtree including blocks b, c, d, and z represents the path for exiting the loop and is also rerouted through the new flow block f.

Rerouting of the open outgoing edges of each subtree through a new flow block f proceeds by creating the new flow block f, replacing each of the open outgoing edges 802, 803, and 804 with edges 812, 813, and 814, respectively, directed to the flow block f Edges 815 and 816 are added to connect the flow block f to blocks e and z, respectively. Flow block f is added to the open tree. The resulting graph 810 is reconverging. Visitation of block d is finished, and block e is visited in the next iteration.

At the time that a flow basic block is created during the main pass, it is not yet known what its successors will ultimately be. During intermediate stages, a flow basic block can have many successors, but if there are more than two successors, then these will eventually be distributed by the creation of yet more flow basic blocks. After the main transformation pass has created the new flow blocks for the CFG, a conditional branch instruction is ultimately added to terminate each of the new flow blocks. Conditions for the branch instructions are generated so that threads jump from the flow block to the correct successor block. For each of the successor blocks, a Boolean value is inserted into the program that indicates whether the successor is the target of the branch terminator. In one embodiment, the rerouting subroutine creates, for each flow basic block, a one-hot set of Boolean phi nodes having values indicating which of the successors to branch to. This set of Boolean values can be used when flow basic blocks are chained.

A phi node is an instruction that selects a value depending on the predecessor of the current block; accordingly, a phi node can be used in a flow block to assert a Boolean value corresponding to the flow block's predecessor. This Boolean value can then be used to determine which successor block the thread should branch to after the flow block. Referring back to FIG. 8, edges 802-804 are rerouted through the flow block f Thus, a phi node is included in the flow block f that asserts a Boolean value corresponding to block d for threads arriving at the flow block f from block d. In response to assertion of the Boolean value corresponding to block d, a branch terminator at the end of the flow block f subsequently jumps to block z, recreating the path of the original edge 804. The phi node in flow block f similarly causes threads from block c to continue to block e (in accord with the original edge 802) and from block b to block z (in accord with the original edge 803). In addition, any phi nodes that originally existed in the successor blocks e and z are also corrected, since threads arriving at these blocks will now be arriving from the flow block f instead of the original predecessor blocks. In one embodiment, modification of branch instructions and/or phi nodes is performed after the main transformation pass is completed and the final output CFG topology has been determined. Alternatively, the branch instruction and/or phi node modifications are performed during execution of the main transformation pass.

A reconverging CFG supports both thread-level and wave-level control flow. After the conversion of the original CFG to a reconverging CFG by the main transformation pass, lowering the resulting reconverging CFG to wave-level control flow further involves transforming non-uniform branch instructions and generating instructions that manipulate the execution mask. The execution mask indicates which threads of a wave are active at any point in time.

In the transformed reconverging CFG, each non-uniform conditional branch has a successor that is a post-dominator, and each post-dominating block could be a post-dominator for several conditional branches. For each of these conditional branches, a register is reserved for tracking a rejoin mask, which is a bitmask of threads that jump to the post-dominator of the conditional branch, rather than jumping to the non-post-dominating successor. When the post-dominator block is reached, the rejoin mask is added back to the currently active execution mask via a bitwise OR operation.

The appropriate instructions for handling the rejoin and execution masks are added in the reconverging CFG by, for each non-uniform branch: 1) identifying the post-dominating primary successor, 2) adding instructions to store the bitmask of threads that jump to the primary successor, called the rejoin mask, and subtract that bitmask from the execution mask via a bitwise AND-NOT operation, 3) appending a conditional branch that jumps directly to the primary successor when the execution mask is empty, and 4) appending a branch instruction to the secondary successor. For every basic block which is the primary successor of a non-uniform branch, instructions are inserted at the top of the basic block to add the rejoin masks from all predecessors (from operation 2) above) to the execution mask via the bitwise OR operation.

Figure 9:
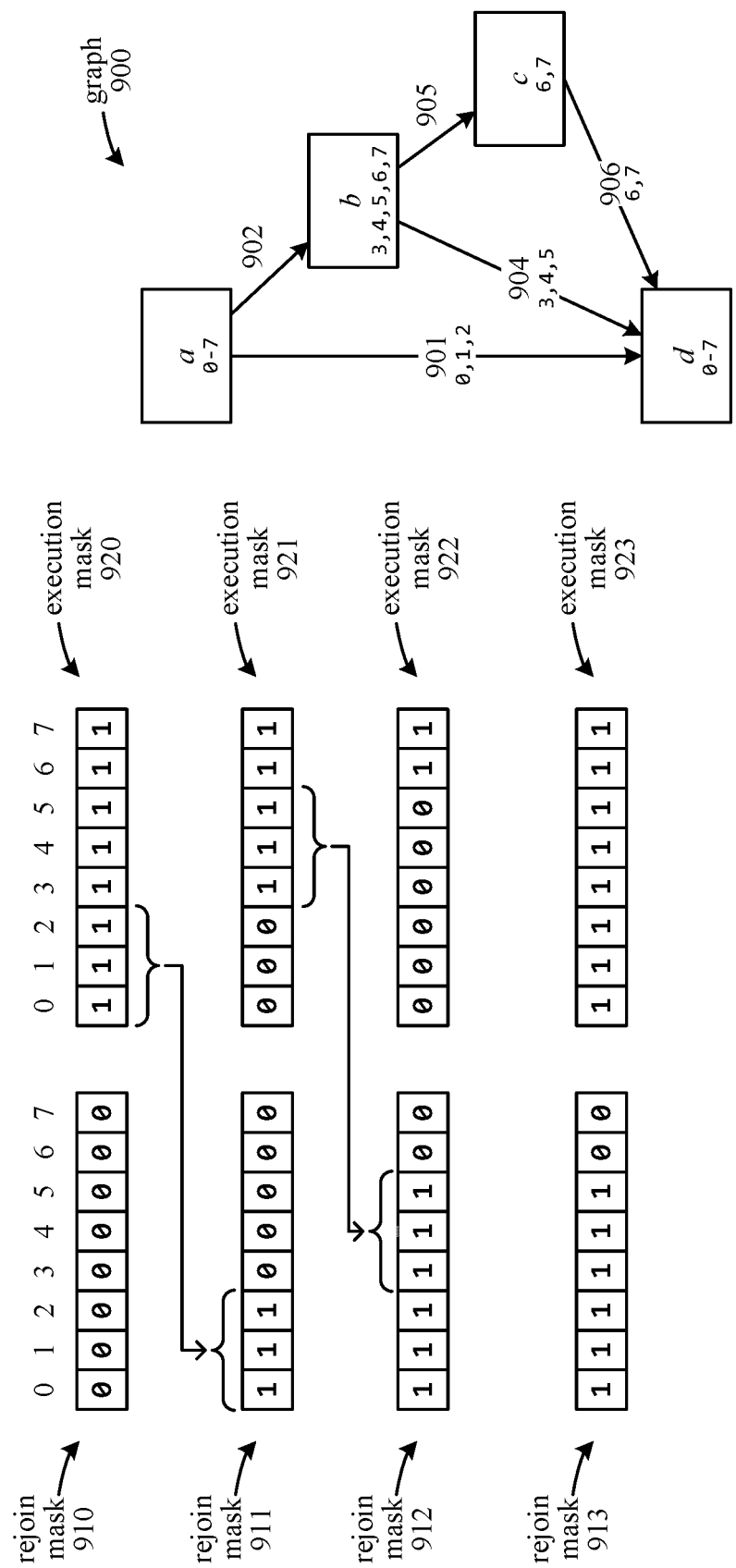
FIG. 9 illustrates operation of rejoin and execution masks for a control flow graph, according to an embodiment.

FIG. 9 illustrates an example of how the rejoin mask and execution mask operate, according to an embodiment. In graph 900 illustrated in FIG. 9, threads branching from blocks a and b rejoin the wave in block d. The rejoin masks and execution masks are handled by instructions in as shown in Table 1 below.

TABLE 1

| | Mask handling instructions | | |
| --- | --- | --- | --- |
| 1 | block a: | ... | |
| 2 | | v_cmp_??? | s[0:1], ... |

TABLE 1-continued

Mask handling instructions

| | | | |
|---|---|---|---|
| 3 | | s_andn2_b64 | exec, exec, s[0:1] |
| 4 | | s_cbranch_execz | d |
| 5 | block b: | ... | |
| 6 | | v_cmp_??? | vcc, ... |
| 7 | | s_or_b64 | s[0:1], vcc |
| 8 | | s_andn2_b64 | exec, exec, vcc |
| 9 | | s_cbranch_execz | d |
| 10 | block c: | ... | |
| 11 | block d: | s_or_b64 | exec, exec, [0:1] |

At the end of block a, the 'v_cmp_???' instruction (line 2) initializes the rejoin mask s[0:1] based on the condition for branching to block d. The asserted bits in the rejoin mask s[0:1] are removed from the execution mask using the 's_andn2_b64' instruction (line 3), which performs a bitwise AND-NOT operation with the rejoin mask s[0:1] and the execution mask value 'exec', with the result stored back in 'exec'. The branch instruction 's_cbranch_execz' (line 4) causes all threads to branch to block d if the execution mask bits are all '0'.

The instructions in block b are executed for threads having their bits asserted in the execution mask 'exec'. At the end of block b, the 'v_cmp_???' instruction (line 6) handles the condition for branching to block d from block b. Subsequently, the bits corresponding to threads branching from block b to block d are added to the rejoin mask by the bitwise OR instruction at line 7. The bits for threads branching from block b to block d are removed from the execution mask at line 8. The branch instruction 's_cbranch_execz' (line 9) causes all threads to branch to block d if the execution mask bits are all '0'.

The instructions in block c are executed for threads having their bits asserted in the execution mask 'exec'. All remaining threads then branch unconditionally to block d. At the beginning of block d, the 's_or_b64' instruction (line 11) adds the rejoin mask back to the execution mask via a bitwise OR operation so that all threads that had previously branched to block d from blocks a and b are rejoined with the wave.

FIG. 9 illustrates the progress of a rejoin mask 911-913 and an execution mask 920-923 during execution of blocks a-d in the control flow graph 900. Each of the eight bits in the rejoin mask 910 and execution mask 920 represents a thread. The rejoin mask 910 begins with all bits deasserted, and the execution mask 920 begins with all bits asserted; thus, all threads 0-7 execute the instructions in the entry block a. At the end of block a, threads 0, 1, and 2 branch to block d via edge 901 according to the branch condition in block a. Therefore, the corresponding bits 0, 1, and 2 for these threads are asserted in the rejoin mask 911 and deasserted in the execution mask 921. The remaining threads continue to block b via edge 902.

According to the new execution mask 921 values, threads 3-7 are active in block b. At the end of block b, threads 3, 4, and 5 branch to block d via edge 904 according to the branch condition in block b. Therefore, the corresponding bits 3, 4, and 5 for these threads are asserted in the rejoin mask 912 and deasserted in the execution mask 922.

The execution mask 922 now has bits asserted for threads 6 and 7, which are active in block c. From block c, these threads branch unconditionally to block d. At the beginning of block d, the execution mask 922 is combined with the rejoin mask 913, so that all threads are rejoined to the wave, as shown by execution mask 923.

If block a has a uniform branch, all branches continue to either block b or block d. In either case, the bitwise OR instruction is added in block d. Therefore, the rejoin mask in block a is initialized to 0 when block a terminates in a uniform branch, so that the rejoin mask is correct in case the wave jumps from block a to block d.

Figure 10:
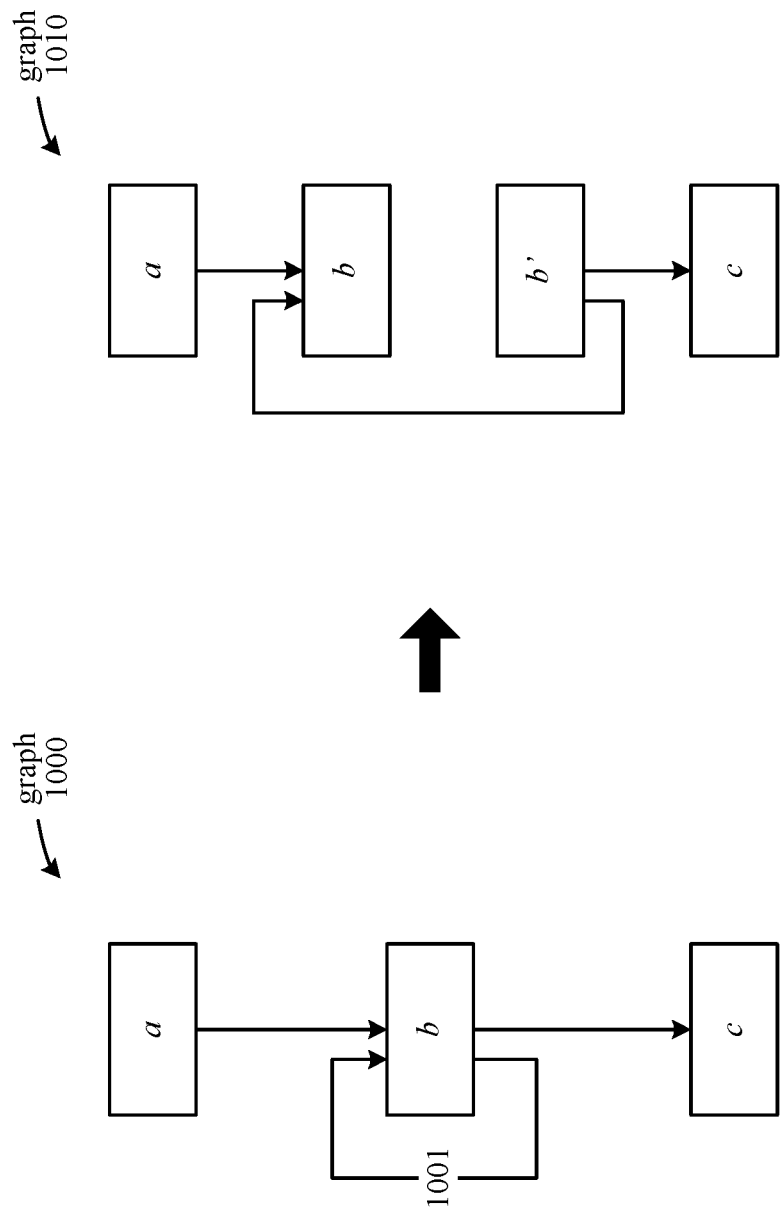
FIG. 10 illustrates splitting of a looped block prior to instruction insertion, according to an embodiment.

FIG. 10 illustrates a control flow graph 1000 that contains a loop, in which the rejoin mask for the post-dominating successor block c is accumulated over multiple iterations of block b, according to an embodiment. Accordingly, the rejoin mask is also initialized to 0 in block a. In one embodiment, a unified routine inserts appropriate mask handling instructions in a reconverging CFG (e.g., graph 900), and is also able to correctly handle CFGs that include one or more loop structures (e.g., graph 1000). The following operations generate the rejoin and execution mask handling instructions for a basic block B.

According to a first step, a set of basic blocks P is identified where each block in P is a predecessor of block B for which block B is a post-dominating primary successor. Each of the blocks in set P might have threads that will rejoin the wave at block B. A virtual register m is reserved to store the rejoin mask of block B.

In a second step, if block B has an edge that loops back to itself, then block B is virtually split into two basic blocks B and B', where B has all the predecessors of B but no successors, and B' has all the original successors of B. For example, with reference to FIG. 10, graph 100 contains blocks a, b, and c, where block b has an edge 1001 that loops to itself. Accordingly, block b is split into blocks b and b', as shown in graph 1010. Block b has all the original predecessors (i.e., block a), while block b' has the successors (i.e., block c).

According to a third step, a forward traversal of the CFG is performed, starting at P and ending in B to find the set P* of all blocks reachable from P, and the subset P0 of nodes in P which do not have predecessors in P*. The set P* of all blocks reachable from the predecessors P is found by traversing the CFG from the predecessors P until block B is reached. All of the traversed paths lead to block B because block B is a post-dominator of all the blocks in set P. The notation 'P0' indicates an initial (i.e., 0th) predecessor in a sequence of blocks in which a rejoin mask is active, while 'P*' indicates subsequent levels of predecessor blocks in the sequence.

Referring to graph 900 in FIG. 9, block d is currently visited and corresponds to block B. Block d is the primary successor that post-dominates blocks a and b; therefore, blocks a and b are in the set P. Block c is not included in P because block c does not have a non-uniform conditional branch, but instead branches unconditionally to block d. However, block c is reachable from blocks a and b in set P; therefore, block c is in set P* of blocks reachable from blocks in set P. Block b is reachable from block a and is also in set P*. Only block a is in set P0, which includes all predecessor blocks in set P that are not reachable from other predecessors in set P.

Block a is thus identified as the first block in which the rejoin mask is active, so an instruction is added to block a to initialize the rejoin mask, as provided in a fourth step. According to the fourth step, a move instruction is inserted in each node in set P0 (e.g., block a). The move instruction initializes the rejoin mask m by setting it equal to the mask of threads which branch to B (i.e., block d in graph 900). Referring to FIG. 9, this initial move instruction in block a asserts bits 0, 1, and 2 in rejoin mask 911. In one embodiment, the move instruction is later merged into a preceding instruction (e.g., the 'v_cmp_???' instruction in the example). Alternatively, the merged instruction is generated at the outset, instead of a separate move instruction.

According to a fifth step, for all blocks in the set P (the predecessors of B) but not in set P0 (the initial predecessors), a bitwise OR instruction is inserted which adds the bitmask of threads branching to the post-dominating primary successor block B to the rejoin mask m. For these blocks, the rejoin mask is already active, so the OR instruction is inserted to add threads to the already active rejoin mask when the threads jump to the post-dominator block d.

Continuing the example shown in FIG. 9, the predecessor blocks other than block a are identified as blocks that are in P and not in P0. In graph 900, this includes only block b. The OR instruction is added to block b. From block b, threads 3, 4, and 5 jump to block d; therefore, the OR instruction adds the bitmask with bits 3, 4, and 5 asserted to the rejoin mask 911, resulting in rejoin mask 912.

According to a sixth step, a set Q is identified that includes predecessors of P* that are not in P0 and are not in P*. These are blocks that serve as entry points to blocks in which the rejoin mask is active. Thus, the rejoin mask is initialized to 0 in these blocks Q before the threads enter the active region of the rejoin mask. In a seventh step, an instruction that sets the rejoin mask m to 0 is inserted in each basic block in set Q.

Continuing the example in FIG. 9, the rejoin mask is active in blocks b, c, and d. If any of these blocks have incoming edges from other predecessor blocks, these predecessor blocks are in set Q. As illustrated, graph 900 does not have any blocks in set Q; therefore, no additional instructions are added for setting the rejoin mask to 0. However, if block b, for example, had an incoming edge from a uniform branch terminator of another block, the other block would be in set Q and an instruction would be inserted in the block to initialize the rejoin mask to 0 prior to entering block b.

FIG. 10 illustrates how the above procedure handles a loop in a CFG. In graph 1000, block c is the post-dominating primary successor block, and block b is a predecessor in set P. Block b is not in set P0 because block b is reachable from itself. Therefore, a bitwise OR instruction is added to block b as provided by the fifth step in the procedure. Set P*, in which the rejoin mask is active, includes both block b and block c. Set P0 is empty; therefore, blocks b and c are in set P* and not in P0. Block a is in set Q according to the sixth step because block a is a predecessor of block b. Accordingly, an instruction is inserted in block a to initialize the rejoin mask to 0. Ultimately, the rejoin mask is initialized to 0 in block a, then the rejoin mask accumulates asserted bits for any threads leaving the block b loop over each iteration of block b. The threads indicated in the rejoin mask are eventually added back to the wave at block c.

Figure 11:
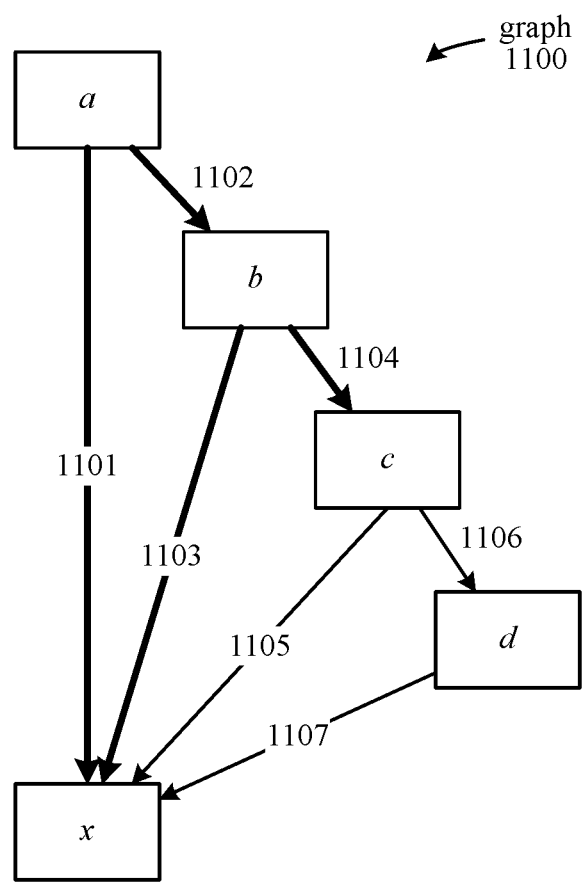
FIG. 11 illustrates a control flow graph including both uniform and non-uniform edges, according to an embodiment.

FIG. 11 illustrates a graph 1100 that includes mixed incoming uniform and non-uniform edges, according to an embodiment. In graph 1100, the edges 1101-1104 are edges from uniform branches, and edge 1105 is non-uniform. According to the previously described procedure for inserting mask handling instructions, instructions are inserted to initialize the rejoin mask for block x to 0 in both of blocks a and b. The rejoin mask is then reinitialized at block c to the bitmask of threads conditionally branching from block c to block x.

In one embodiment, the initialization of the rejoin mask in block b is skipped because block a dominates block b, although this tends to increase register pressure in block b. Alternatively, this can be avoided by introducing a new flow block having blocks c and d as predecessors. The new flow block would post-dominate blocks c and d, and the rejoin mask could then be initialized at block c. Threads leaving blocks c and d are then rejoined at the flow block instead of block x.

Figure 12A:
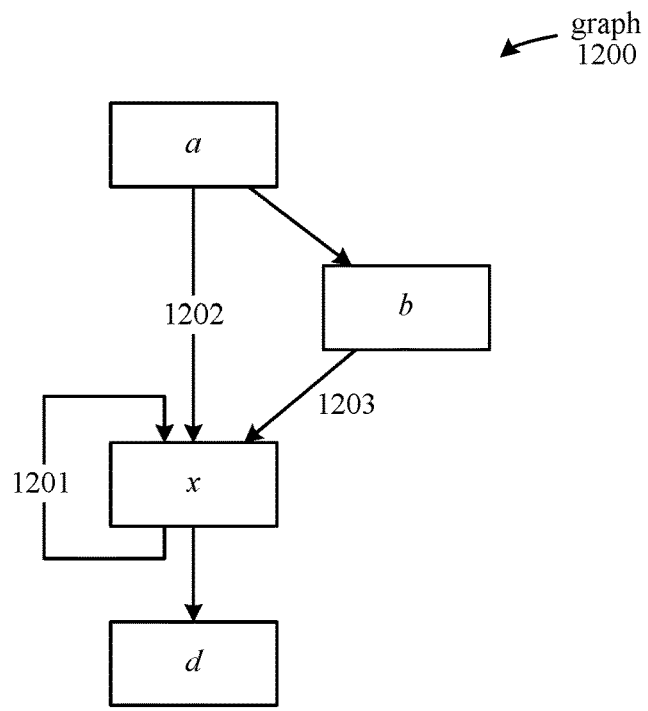
FIG. 12A illustrates a control flow graph that includes both backward and forward edges, according to an embodiment.

FIG. 12A illustrates a graph 1200 that mixes incoming backward and forward edges, according to an embodiment. In graph 1200, the basic block x has an incoming backward edge 1201 and two incoming forward edges 1202 and 1203. The rejoin mask for block x handles threads that will rejoin the wave at block x after arriving at block x via the incoming edge 1202 from only block a; however, the rejoin mask is also reinitialized to 0 in block x due to the backward edge 1201. This is handled correctly because block x is looped and is therefore split into blocks x and x', where Q contains block x'. The reinitialization of the rejoin mask to 0 is then inserted at block x'. Alternatively, a new flow block can be introduced having predecessors a and b. As with the example in FIG. 11, the newly introduced flow block would have as predecessors precisely those predecessors of block x which are in the set P*.

Figure 12B:
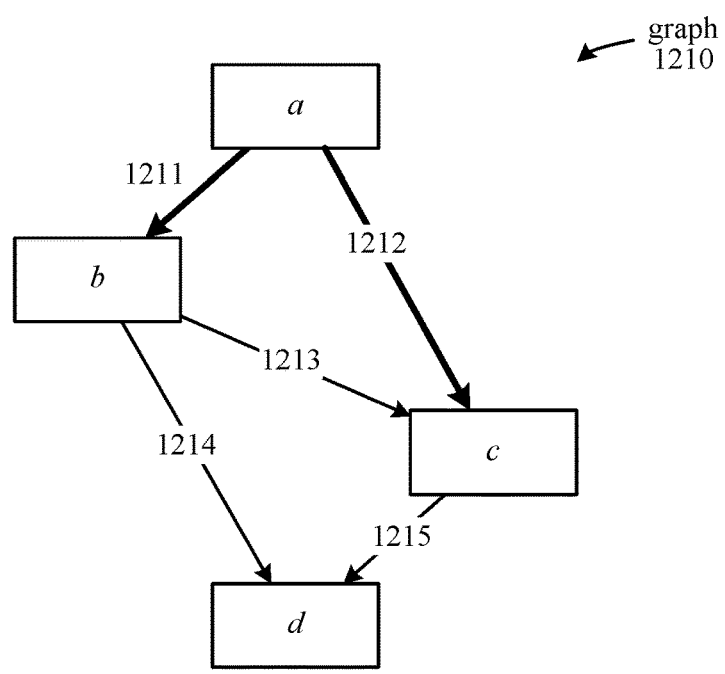
FIG. 12B illustrates a graph having edges representing both uniform and non-uniform control flow, according to an embodiment.

FIG. 12B illustrates a graph 1210 having edges representing both uniform and non-uniform control flow. In graph 1210, the edges 1211 and 1212 represent uniform control flow, while edges 1213-1214 represent non-uniform control flow. In graph 1210, the rejoin mask for block d is initialized to 0 in block a to handle the case where the edge 121 from block a to block c is taken. Block a is a predecessor of block c, and is therefore included in set Q. If the edge 1211 from block a to block b is taken, the rejoin mask will be reinitialized at block b to the mask of threads that take the edge 1214 from block b to block d.

Figure 13:
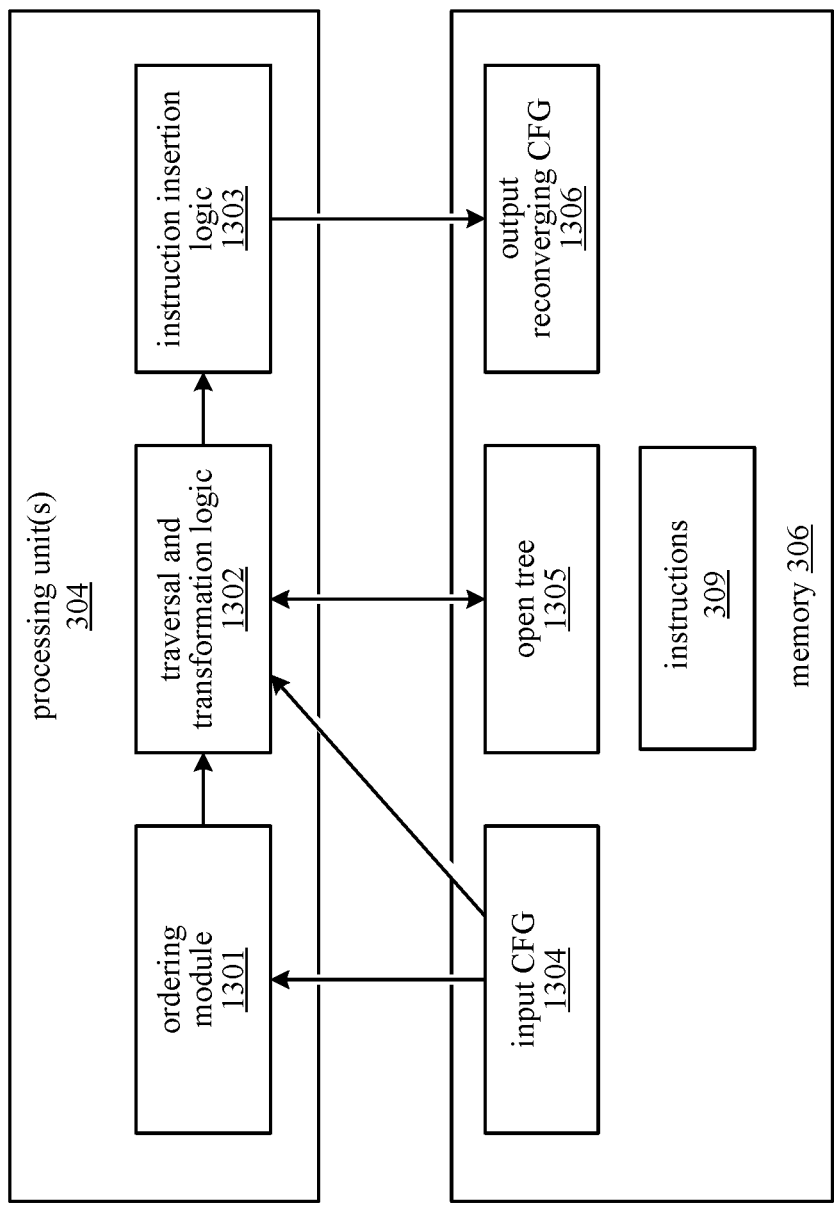
FIG. 13 illustrates components in a computing device, according to an embodiment.

FIG. 13 illustrates physical components used to transform an input CFG to a reconverging CFG, according to an embodiment. The components 1301-1303 are implemented in the processing unit 304 as hardware circuitry, software, or a combination of hardware and software. For example, the components 1301-1303 in one embodiment are implemented as software modules by executing instructions 309 recorded on a non-transitory computer readable storage medium in the memory 306, and/or as hardware accelerators, logic, and/or other physical circuit components. The ordering module 1301 receives an input CFG 1304 and determines an order for the basic blocks in the input CFG 1304. In one embodiment, the ordering module 1301 determines the order based on a depth-first search (DFS) traversal of the input CFG 1304, and thus maintains a DFS stack 1307 in the memory 306 to track blocks that have been visited during the DFS traversal. The traversal and transformation logic 1302 receives the determined order from the ordering module 1301 and traverses the input CFG 1304 according to the determined order to transform the CFG 1304 into a reconverging CFG. The traversal logic also maintains the open tree data structure 1305 during traversal and transformation of the input CFG 1304. The instruction insertion logic 1303 inserts appropriate instructions into the generated reconverging CFG to handle the rejoin and execution masks. The output reconverging CFG 1306 is stored in the memory 306.

Figure 14:
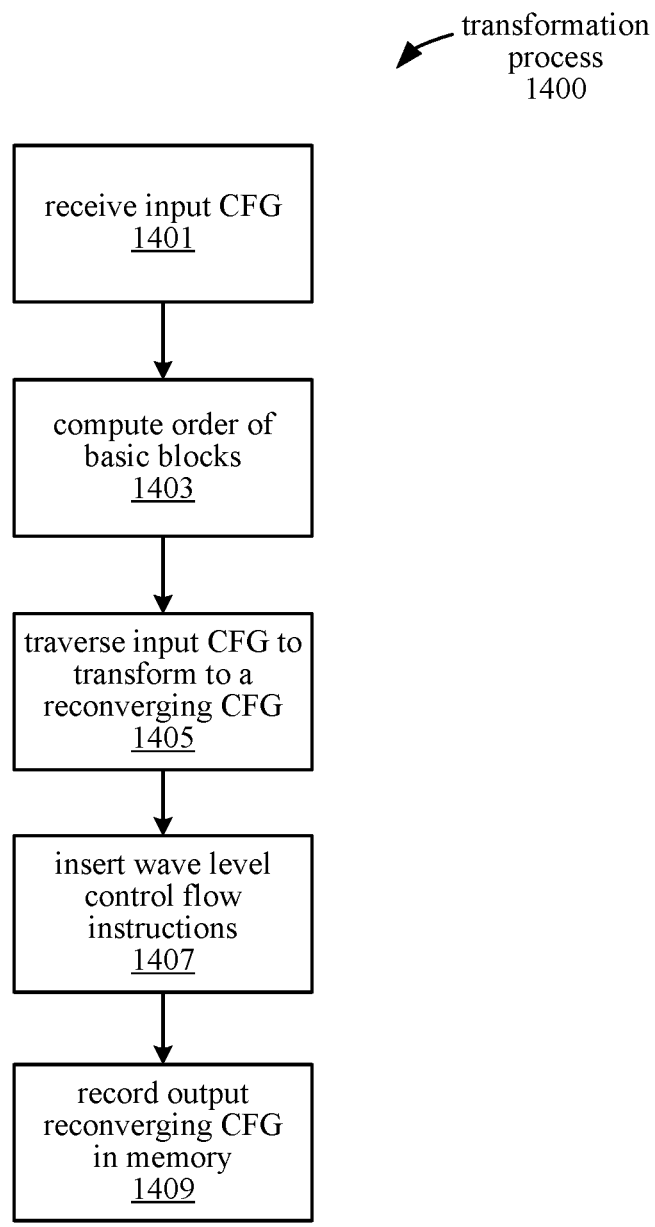
FIG. 14 is a flow diagram illustrating a process for transforming a control flow graph, according to an embodiment.

FIG. 14 illustrates a process 1400 for transforming an input CFG to a reconverging CFG, according to an embodiment. The process 1400 is performed by the hardware and/or software components of a computing device 300 to transform an input CFG 1304 to a reconverging CFG 1306. At 1401, the computing device 300 receives the input CFG 1304, that includes multiple basic blocks connected by edges. In one embodiment, the input CFG is received when it is recorded in memory 306, or otherwise made accessible to the processing unit 304.

At 1403, the ordering module 1301 determines an order for the basic blocks in the received input CFG 1304. After the order is determined for the basic blocks, the traversal and transformation logic 1302 traverses the input CFG 1304 according to the determined order, as provided at 1405. During this traversal, the transformation logic 1302 modifies the CFG by inserting flow blocks, changing or adding edges, and other operations for transforming the input CFG 1401 into an equivalent reconverging CFG. At 1407, the instruction insertion logic 1303 inserts instructions for handling the rejoin masks and execution masks used to effect wave level control flow. The finished reconverging CFG 1306 is stored in the memory 306, per 1409.

Figure 15:
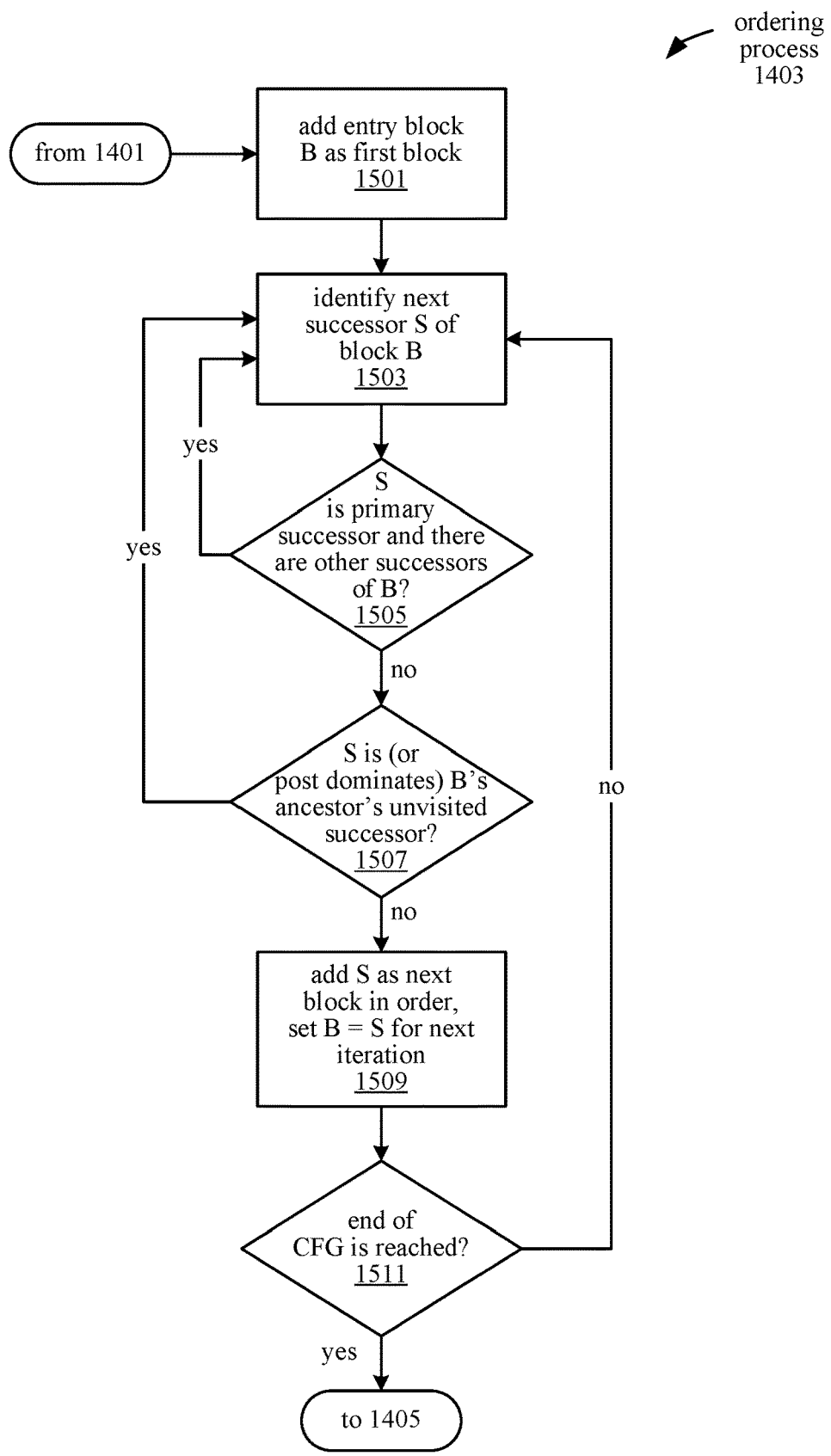
FIG. 15 is a flow diagram illustrating a process for determining an order of basic blocks, according to an embodiment.

FIG. 15 illustrates an ordering process 1403 for determining the order of basic blocks in the input CFG 1304, according to an embodiment. The process 1403 is performed by the ordering module 1301. From 1401 in process 1400, the process 1403 begins at operation 1501. The ordering process 1403 orders the basic blocks by conducting a depth-first search (DFS) of the input CFG 1304, utilizing a DFS stack 1307 to keep track of the blocks that have already been visited in the DFS. At operation 1501, the entry block of the input CFG 1304 is pushed onto the DFS stack 1307 as the top element. At operation 1503, the top element from the DFS stack 1307 is selected as a currently visited block B. At operation 1505, if block B does not have any unvisited successor blocks in the input CFG 1304, then the top element is removed from the DFS stack 1307 at operation 1507. From 1507, the process 1403 returns to operation 1503. At operation 1503, the remaining top element of the DFS stack 1307 is selected as the currently visited block B. Operations 1503-1507 repeat until a block B having unvisited successors is selected from the DFS stack 1307. At operation 1505, when a block B is selected that has unvisited successors, then the next successor S of block B is identified at operation 1509.

At 1511, if the selected successor block S is the primary successor that post-dominates B and there are other successors of B that have not yet been added to the order, then block S is skipped. The process 1403 instead returns to 1509 to select another successor block S that is not the primary successor. According to 1509 and 1511, when block B has multiple successors, the primary successor is added to the order last. If the selected successor block S is not the primary successor that post-dominates B, then the process 1403 continues from operation 1511 to operation 1513.

At 1513, if block S is a successor of an ancestor block of the basic block B, or if block S post-dominates an unvisited successor of an ancestor of block B, then block S is skipped. In this case, block S is reachable from another path and is added to the order when the other path is traversed. The process 1403 returns to 1509 to identify a different successor block S.

If both conditions 1511 and 1513 are false, the process 1403 adds the successor block S as the next block in the order, as provided at 1515. Block S is pushed onto the DFS stack 1307 for the next iteration of the loop 1503-1517. At 1517, if the end of the CFG 1304 has not been reached, the process 1403 returns to 1503 to continue traversing the CFG 1304 and adding successor blocks to the order. The end of the CFG 1304 is reached when the exit block of the CFG 1304 has been added to the order. The process 1403 then continues from 1517 to 1405.

In the resulting order determined by process 1403, for each region having a single entry block and a single exit block, the entry block precedes the exit block in the order. Intermediate blocks in parallel branches between the entry and exit blocks in each region are placed subsequent to the entry block and prior to the exit block, and are ordered according to a depth first traversal within the branches, subject to the conditions in 1511 and 1513.

Figure 16A:
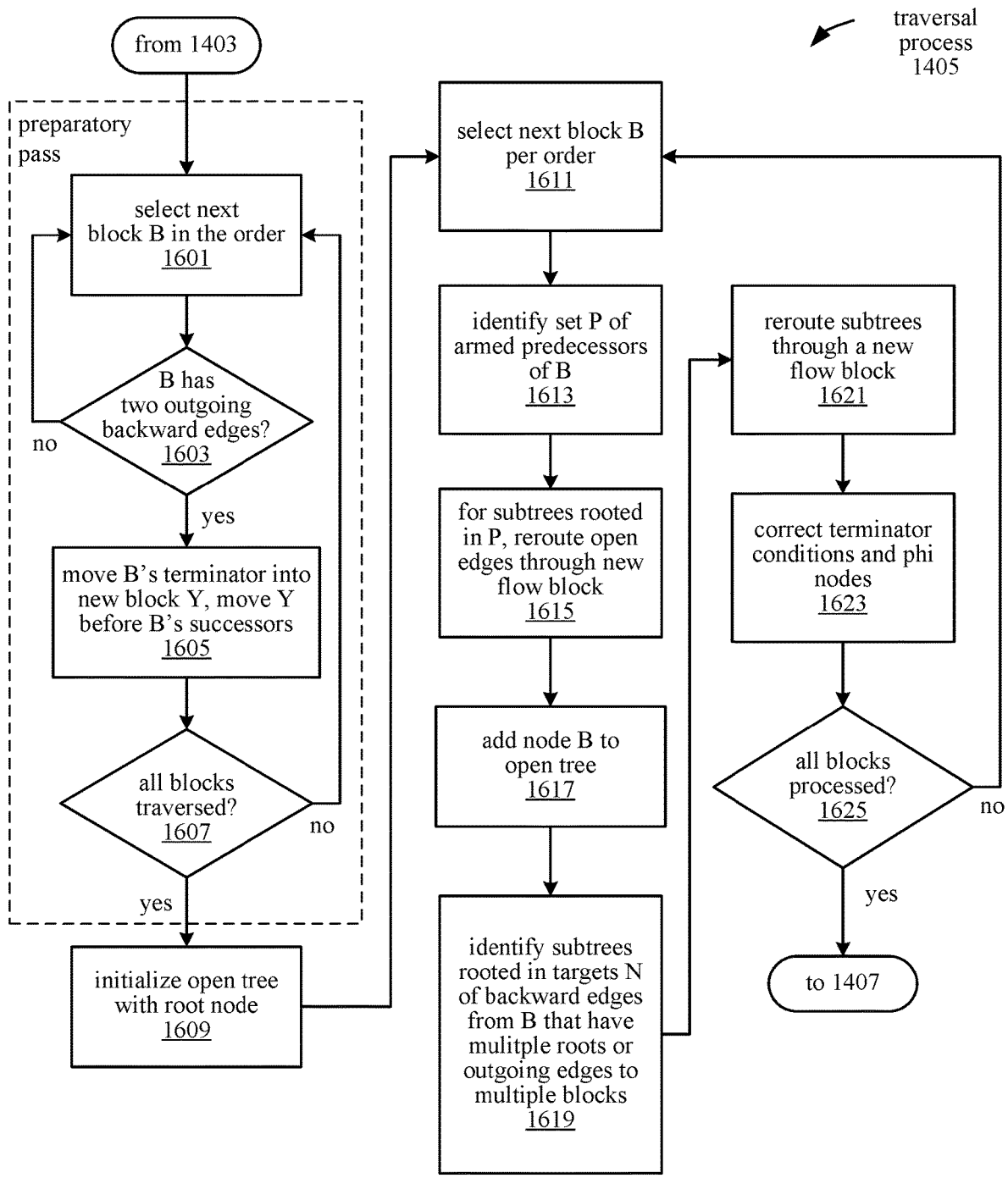
FIG. 16A is a flow diagram illustrating a process for traversing and transforming a control flow graph, according to an embodiment.

FIG. 16A illustrates a traversal process 1405, in which the input CFG 1304 is traversed according to the determined order and transformed into a reconverging CFG, according to an embodiment. The process 1405 is performed by the traversal and transformation logic 1302. From 1403, the process 1405 begins with a preparatory pass 1601-1607 that modifies the blocks and edges in the CFG so that each block in the CFG has at least one forward edge.

At 1601, the next block B is selected in the determined order. At 1603, if block B does not have a non-uniform terminator that establishes two outgoing backward edges, no further action is taken, and the process 1405 returns to 1601 to select the next block in the order. If block B has two outgoing backward edges, then the process 1405 continues from 1603 to 1605.

At 1605, a new virtual block Y is created, and the terminator from block B is moved into block Y. Block Y is inserted prior to the successors of B (i.e., the targets of the backward edges) in the order. An unconditional branch terminator directed to block Y is added to block B. At 1607, if all of the blocks in the order have not been processed, the process 1405 returns to 1601 to select the next block in the order as block B for the next iteration. When all of the blocks in the order have been processed, the process 1405 continues from 1607 to 1609. At 1609, the open tree data structure 1305 is initialized to contain a virtual root node.

At 1611, an initial block B in the order is selected as a currently visited block. At block 1613, a set P of armed predecessor blocks of block B is identified. Armed blocks have one or more open edges to one or more basic blocks that are absent from the open tree 1305. If set P is not empty, then for each subtree that is rooted in one of the blocks in P, the open edges of the subtree are rerouted through a new flow block, as provided at 1615. At 1617, node B representing block B is added to the open tree 1305.

At 1619, a set of one or more visited successor blocks N that are connected to block B via one or more backward outgoing edges is identified. If the subtrees rooted at blocks in set N have multiple roots or outgoing edges to multiple blocks, then the open edges (i.e., directed to blocks absent from the open tree 1305) of these subtrees are rerouted through a new flow block, as provided at 1621.

At 1623, the process 1405 corrects any terminator conditions and phi nodes for the blocks and edges rerouted according to 1611-1621. At 1625, if all blocks in the CFG 1304 have not yet been processed, the process 1405 returns to 1611 to select the next block B according to the order. When all of the blocks in the CFG 1304 have been processed, the process 1405 continues at 1407.

Figure 16B:
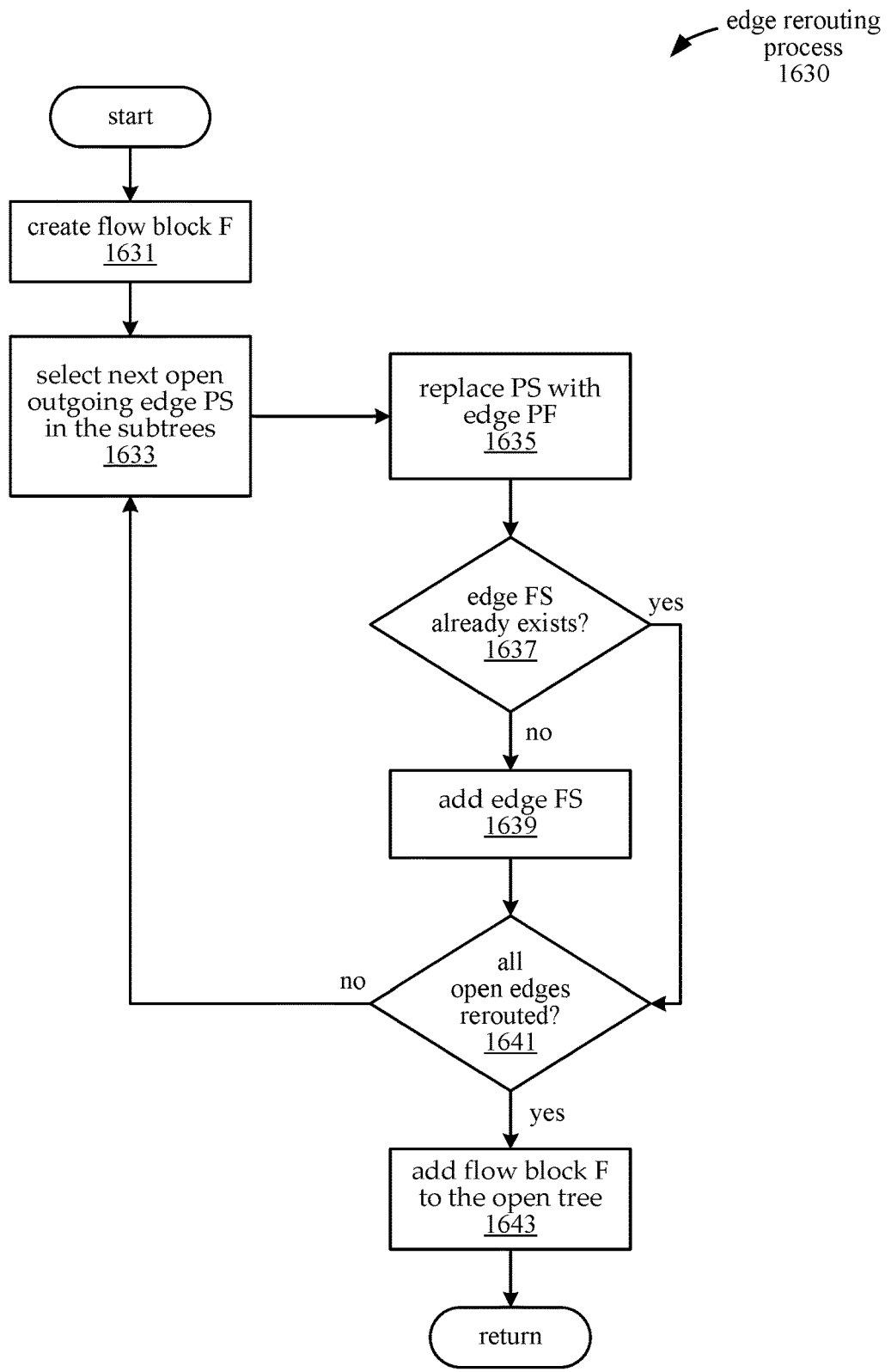
FIG. 16B is a flow diagram illustrating a process for rerouting edges through a flow block, according to an embodiment.

FIG. 16B illustrates a process 1630 for rerouting open edges of a subtree through a new flow block, according to an embodiment. The process 1630 is invoked when performing operations 1621 and 1615 in process 1405. The process 1630 starts with the creation of a new flow block F, at 1631. At 1633, a next open outgoing edge PS (connecting a predecessor block P with a successor block S that is not in the open tree 1305) is selected from one of the blocks in the subtree.

At 1635, the edge PS is replaced with an edge PF connecting the predecessor block P with the new flow block F. At 1637, if the edge FS between the flow block and the successor block S already exists (e.g., it was added when rerouting an earlier edge through the flow block F), then the process 1630 skips 1639 and continues at 1641. If the edge FS does not already exist, it is created at 1639.

At 1641, if all of the open edges of the subtree have not been rerouted through the flow block F, the process 1630 returns to 1633 to select the next open outgoing edge for rerouting. When all of the edges have been rerouted, the process 1630 continues from 1641 to 1643. At 1643, the flow block F is added to the open tree 1305.

Figure 16C:
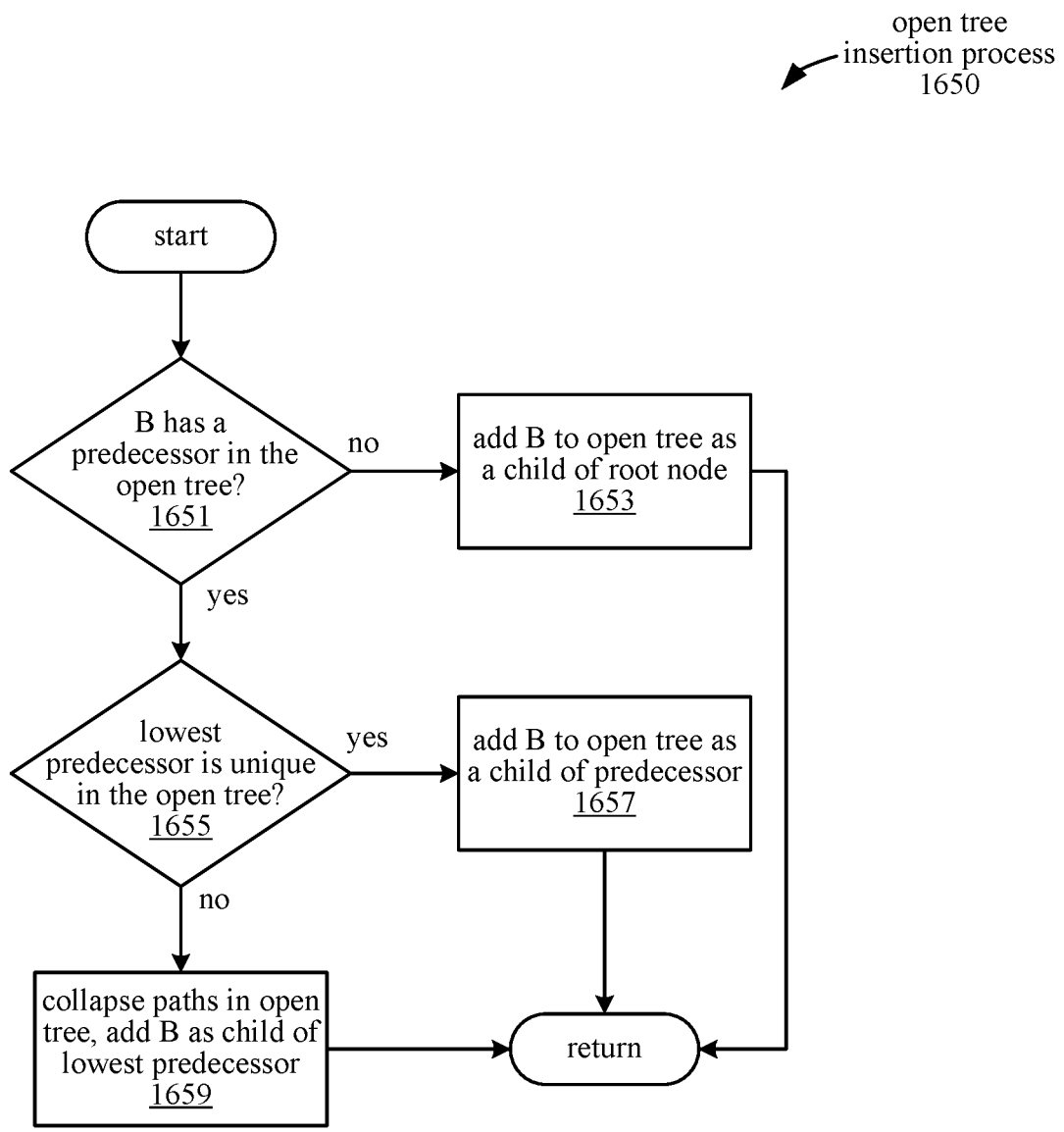
FIG. 16C is a flow diagram illustrating a process for inserting a node in an open tree data structure, according to an embodiment.

FIG. 16C illustrates a process 1650 for adding a block to the open tree, according to an embodiment. The process 1650 is invoked when performing operation 1617 in process 1405. The open tree insertion process 1650 starts by determining whether the currently visited block B has a predecessor in the open tree 1305, as provided at 1651. If block B does not have any predecessors represented in the open tree 1305, then at 1653, block B is added to the open tree 1305 by adding a node B representing block B as a child of the virtual root node. At 1651, if block B already has a predecessor in the open tree 1305, the process 1650 continues at 1655.

At 1655, if the predecessor of block B is uniquely the lowest predecessor of block B in the open tree 1305, then node B is added to the open tree 1305 as a child of the lowest predecessor, as provided at 1657. It is possible that the open tree 1305 contains two or more predecessor blocks of the basic block B in separate branches of the open tree 1305, such that none of the predecessor blocks is uniquely the lowest predecessor of block B. At 1655, if the predecessor is not a lowest unique predecessor, the process 1650 continues at 1659. At 1659, the paths in the open tree leading to the predecessors are combined into a single branch with a single lowest predecessor of block B, and node B is added as a child of the lowest predecessor. From 1653, 1657, and 1659, the process 1650 returns to the traversal process 1405.

Figure 17:
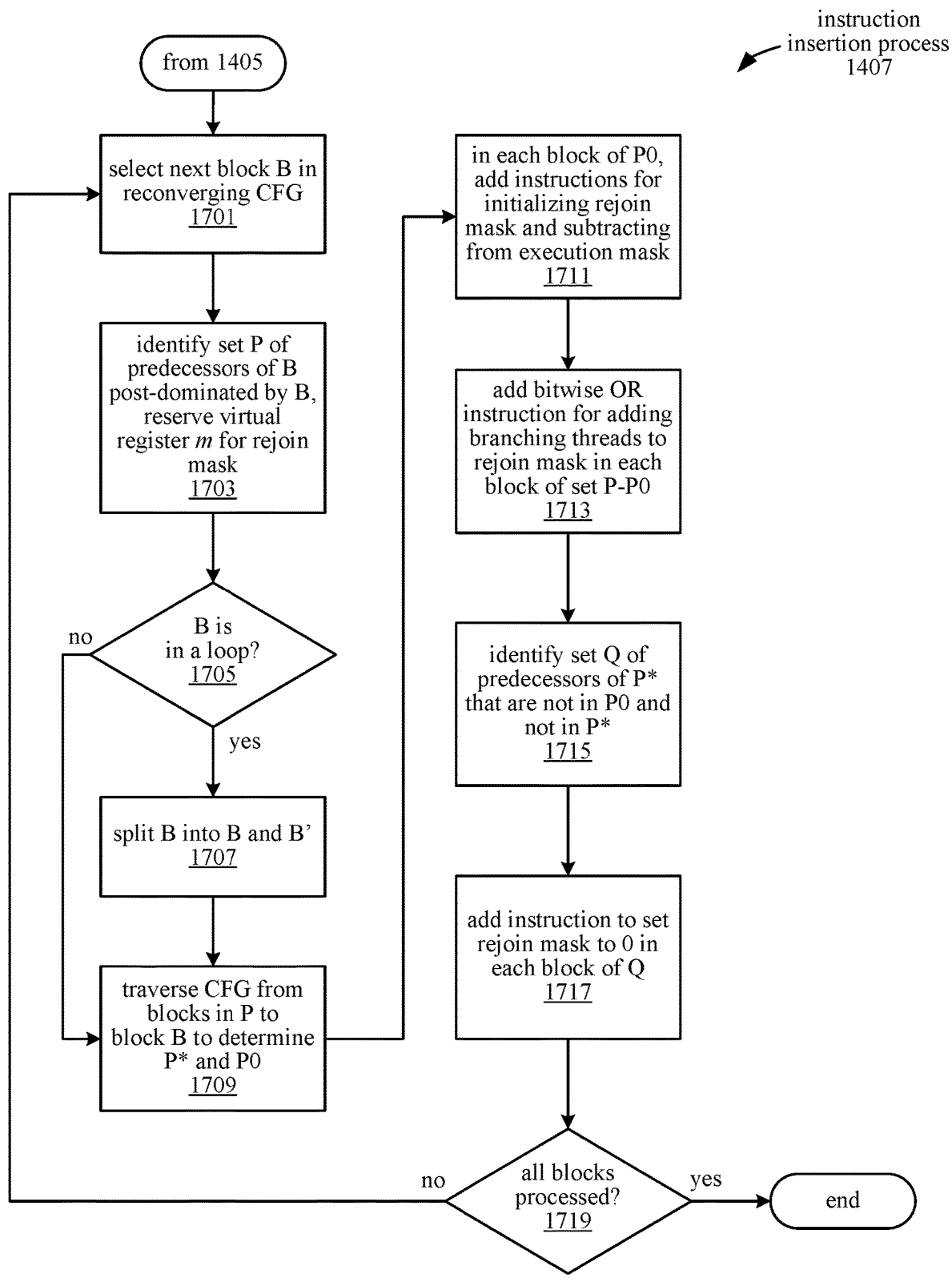
FIG. 17 is a flow diagram illustrating a process for inserting instructions in a reconverging control flow graph, according to an embodiment.

FIG. 17 illustrates an instruction insertion process 1407, according to an embodiment. The process 1407 is performed by the instruction insertion logic 1303. From 1405, the process 1407 begins at 1701 with the selection of an initial block B from the reconverging CFG produced by the previous operations 1401-1405.

At 1703, a set P of predecessors of block B with non-uniform conditional branches and that are post-dominated by block B is identified. Each of the predecessor blocks in set P has block B as a primary successor in the CFG. A virtual register m is also reserved for storing the rejoin mask for block B. At 1705, if block B is in a loop, then block B is split into block B and block B', where block B has retains edges from the predecessors of block B and block B' has the outgoing edges to the original successors of B. If block B is not in a loop, then 1707 is skipped and the process 1407 continues from 1705 to 1709.

At 1709, the CFG is traversed from the predecessor blocks in set P to block B to determine the set P* of all blocks reachable from P, and the subset P0 of nodes in P which do not have predecessors in P*. At 1711, a move instruction for initializing the rejoin mask is added to each block in the set P0. The move instruction initializes the rejoin mask with the bitmask indicating which threads jump to block B from the P0 block in which the instruction is added. A bitwise AND-NOT instruction for subtracting the bits of the rejoin mask from the execution mask is also added to the P0 block.

At 1713, a bitwise OR instruction is added to each block in the set P that is not in set P0. Each bitwise OR instruction adds a rejoin bitmask for the predecessor block to the rejoin mask of threads to be rejoined in the primary successor B that post-dominates the predecessor block. The threads branching to block B from any of its predecessors in set P are added to the primary rejoin mask and eventually rejoined with the wave via addition of the primary rejoin mask with the execution mask via another bitwise OR operation at block B.

At 1715, a set Q is identified that includes predecessor blocks of P* is that are not in P0 and not in P*. An instruction is added to each block in set Q that initializes the rejoin mask to 0, at 1717. Accordingly, the rejoin mask is properly initialized when the wave enters the region in which the rejoin mask is active via one of the alternative entry blocks in set Q.

At 1719, if all of the blocks B in the reconverging CFG have not yet been processed, the process 1407 returns to 1701 to select the next block B. Operations 1701-1719 are thus performed for each of the blocks B in the reconverging CFG. When all of the blocks in the CFG have been processed, the process 1407 ends and the output reconverging CFG, including instructions for handling the rejoin and execution masks, is recorded in memory 306.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing device 300 and/or portions thereof carried on the computer-readable storage medium may be a database or other data structure which can be read by a program and used, directly or indirectly, to fabricate the hardware including the computing device 300. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing device 300. The netlist may then be placed and routed to produce a data set describing geometric shapes to be applied to masks. The masks may then be used in various semiconductor fabrication steps to produce a semiconductor circuit or circuits corresponding to the computing device 300. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A computing system, comprising:
a processor;
a memory storing instructions that, when executed by the processor, cause the processor to generate a reconverging control flow graph by:
receiving an input control flow graph including a plurality of basic code blocks and one or more open edges;
determining an order of the basic code blocks, wherein each of the one or more open edges connects one of the plurality of basic code blocks with another of the basic code blocks block earlier or later in the determined order of the basic code blocks; and
traversing the input control flow graph by, for each basic code block B of the plurality of basic code blocks:
according to the determined order of the basic code blocks, visiting the basic code block B prior to visiting a subsequent block C of the plurality of basic code blocks, and
based on determining that the basic code block B has a prior block A and that the prior block A has an open edge AC to the subsequent block C, in the reconverging control flow graph:
creating an edge AF between the prior block A and a flow block F1, and
creating an edge FC between the flow block F1 and the subsequent block C.

2. The computing system of claim 1, wherein:
each of the plurality of basic code blocks in the input control flow graph includes instructions of a program;
generating the reconverging control flow graph is performed during compiling of the program; and
the computing system further comprises one or more computing devices configured to execute the compiled program.

3. The computing system of claim 1, wherein the instructions, when executed by the processor, cause the processor to determine the order of the basic code blocks by:
for each basic code block B of the plurality of basic code blocks in the input control flow graph, selecting a successor block from the input control flow graph as a next block to be added to the order, wherein the successor block is one of a set of successor blocks connected via one or more edges to the basic code block B in the input control flow graph, and
wherein the successor block is selected as the next block to be added to the order according to a depth first traversal order in response to determining that:
the successor block does not post dominate the basic code block B,
the successor block has not been added to the order and is a successor of an ancestor block of the basic code block B, and
the successor block does not post dominate another block that has not been added to the order and that is a successor of an ancestor block of the basic code block B.

4. The computing system of claim 1, wherein the instructions, when executed by the processor, further cause the processor to, prior to traversing the input control flow graph, and for each basic code block B in the input control flow graph having a non-uniform terminator and at least two backward outgoing edges:
create a virtual block Y;
move the non-uniform terminator from the basic code block B to the virtual block Y;
add to the basic code block B an unconditional branch terminator directed to the virtual block Y; and
insert the virtual block Y into the order prior to all successor blocks of the basic code block B.

5. The computing system of claim 1, wherein the instructions, when executed by the processor, further cause the processor to:
initialize an open tree data structure containing a virtual root node, wherein traversing the input control flow graph further comprises, for each basic code block B of the plurality of basic code blocks:
in response to determining that the open tree does not include any predecessors of the basic code block B, adding the basic code block B to the open tree as child node of the virtual root node;
in response to determining that the open tree contains a predecessor block of the basic code block B, add the basic code block B to the open tree as a child node of the predecessor block; and
in the input control flow graph, identify a next block for adding to the open tree based on the determined order of the basic code blocks.

6. The computing system of claim 1, wherein the instructions, when executed by the processor, further cause the processor to, for each basic code block B of the plurality of basic code blocks:
identify a set of prior blocks of the basic code block B that includes the prior block A;
based on identifying a set of subtrees rooted at one of the predecessor blocks and having one or more open edges to one or more basic code blocks absent from an open tree data structure, wherein the one or more open edges includes the open edge AC, connect each of the one or more open edges to the flow block F1 in the reconverging control flow graph, wherein connecting each of the one or more open edges to the flow block F1 comprises creating the edge AF;

identify a set of one or more visited successor blocks N connected to the basic code block B via one or more backward outgoing edges;

in response to determining that a set of subtrees rooted in the set of successor blocks N has open outgoing edges to one or more basic code blocks absent from the open tree, connect each of the open outgoing edges to a newly created flow block F2; and add the basic code block B to the open tree data structure according to the determined order.

7. The computing system of claim 1, wherein the instructions, when executed by the processor, further cause the processor to, for each basic code block P0 in a first subset of the plurality of basic code blocks:

if the basic code block P0 contains a non-uniform branch instruction, add to the basic code block P0 a first instruction for saving a rejoin mask and a second instruction for subtracting the rejoin mask from an execution mask via a bitwise AND-NOT operation, wherein the rejoin mask identifies threads jumping to a post dominator of the basic code block P0 due to execution of the non-uniform branch instruction; and add a set of one or more instructions at the beginning of each basic code block P1 in a second subset of the plurality of basic code blocks for adding a bitmask to an execution mask via a bitwise OR operation, wherein the bitmask identifies threads branching from block P1 to a post dominator of block P1.

8. A method performed by a processor for generating a reconverging control flow graph in a compiler, comprising:

receiving an input control flow graph representing control flow in program source code, wherein the input control flow graph includes a plurality of basic code blocks and one or more open edges;

determining an order of the basic code blocks, wherein each of the one or more open edges connects one of the plurality of basic code blocks with another of the basic code blocks block earlier or later in the determined order of the basic code blocks; and traversing the input control flow graph by, for each basic code block B of the plurality of basic code blocks:

according to the determined order of the basic code blocks, visiting the basic code block B prior to visiting a subsequent block C of the plurality of basic code blocks, and based on determining that a prior block A precedes the basic code block B in the order and that the prior block A has an open edge AC to the subsequent block C, in the reconverging control flow graph, creating an edge AF between the prior block A and a flow block F1, and creating an edge FC between the flow block F1 and the subsequent block C.

9. The method of claim 8, wherein determining the order of the basic code blocks further comprises, for each region in the input control flow graph having a single entry block and single exit block:

including the entry block in the order prior to the exit block, wherein the entry block and the exit block are included in the plurality of basic code blocks; and including one or more intermediate blocks subsequent to the entry block and preceding the exit block in the order, wherein in the input control flow graph, the one or more intermediate blocks are positioned in the region subsequent to the entry block and preceding the exit block.

10. The method of claim 8, wherein determining the order of the basic code blocks further comprises:

for each basic code block B of the plurality of basic code blocks in the input control flow graph, selecting a successor block as a next block to be added to the order, wherein the successor block is one of a set of successor blocks connected via one or more edges to the basic code block B in the input control flow graph, and wherein the successor block is selected as the next block to be added to the order according to a depth first traversal order based on determining that:

the successor block does not post dominate the basic code block B, the successor block has not been added to the order and is a successor of an ancestor block of the basic code block B, and the successor block does not post dominate another block that has not been added to the order and that is a successor of an ancestor block of the basic code block B.

11. The method of claim 8, further comprising, prior to traversing the input control flow graph, for each basic code block B in the input control flow graph having a non-uniform terminator and at least two backward outgoing edges:

creating a virtual block Y;

moving the non-uniform terminator from the basic code block B to the virtual block Y;

adding to the basic code block B an unconditional branch terminator directed to the virtual block Y; and inserting the virtual block Y into the order prior to all successor blocks of the basic code block B.

12. The method of claim 8, further comprising:

initializing an open tree data structure containing a virtual root node, wherein traversing the input control flow graph further comprises:

for each basic code block B of the plurality of basic code blocks, in response to determining that the open tree does not include any predecessors of the basic code block B, adding the basic code block B to the open tree as child node of the virtual root node;

in response to determining that the open tree contains a predecessor block of the basic code block B, adding the basic code block B to the open tree as a child node of the predecessor block;

in the input control flow graph, identifying a next block for adding to the open tree based on the determined order of the basic code blocks.

13. The method of claim 12, further comprising:

in response to determining that the open tree contains two predecessor blocks of the basic code block B in separate branches of the open tree, combining the separate branches into a single branch in the open tree.

14. The method of claim 8, further comprising, for each basic code block B of the plurality of basic code blocks:

identifying a set of prior blocks of the basic code block B that includes the prior block A;

based on identifying a set of subtrees rooted at one of the prior blocks and having one or more open edges to one or more basic code blocks absent from an open tree data structure, wherein the one or more open edges includes the open edge AC, connecting each of the one or more open edges to the flow block F1 in the reconverging control flow graph, wherein connecting each of the one or more open edges to the flow block F1 comprises creating the edge AF; and adding the basic code block B to the open tree data structure according to the determined order.

15. The method of claim 8, further comprising, for each basic code block B of the plurality of basic code blocks:
   adding the basic code block B to an open tree data structure according to the determined order;
   identifying a set of one or more visited successor blocks N connected to the basic code block B via one or more backward outgoing edges; and
   in response to determining that a set of subtrees rooted in the set of successor blocks N has open outgoing edges to one or more basic code blocks absent from the open tree, connecting each of the open outgoing edges to a newly created flow block F2.

16. The method of claim 8, further comprising:
   for each basic code block P in a subset of the plurality of basic code blocks, if the basic code block P contains a non-uniform branch instruction, adding to the basic code block P a first instruction for saving a rejoin mask and a second instruction for subtracting the rejoin mask from an execution mask via a bitwise AND-NOT operation, wherein the rejoin mask identifies threads jumping to a post dominator of the basic code block P due to execution of the non-uniform branch instruction.

17. The method of claim 8, further comprising:
   for each basic code block P in a subset of the plurality of basic code blocks, adding a set of one or more instructions at the beginning of the basic code block P for adding a bitmask to an execution mask via a bitwise OR operation, wherein the bitmask identifies threads branching from block P to a post dominator of block P.

18. A non-transitory computer readable storage medium storing instructions, wherein the instructions are executable by a processor to:
   receive an input control flow graph including a plurality of basic code blocks and one or more open edges;
   determine an order of the basic code blocks, wherein each of the one or more open edges connects one of the plurality of basic code blocks with another of the basic code blocks block earlier or later in the determined order of the basic code blocks; and
   traverse the input control flow graph by, for each basic code block B of the plurality of basic code blocks:
   according to the determined order of the basic code blocks, visiting the basic code block B prior to visiting a subsequent block C of the plurality of basic code blocks, and
   based on determining that the basic code block B has a prior block A and that the prior block A has an open edge AC to the subsequent block C, in the reconverging control flow graph:
      creating an edge AF between the prior block A and a flow block F1, and
      creating an edge FC between the flow block F1 and the subsequent block C.

19. The non-transitory computer readable storage medium of claim 18, wherein:
   each of the plurality of basic code blocks in the input control flow graph includes user-defined instructions of a program; and
   the instructions stored in the non-transitory computer readable storage medium are further executable by the processor to generate the reconverging control flow graph during compiling of the user-defined instructions.

20. The non-transitory computer readable storage medium of claim 18, wherein the instructions stored in the non-transitory computer readable storage medium are further executable by the processor to:
   add the basic code block B to an open tree data structure according to the determined order;
   identify a set of prior blocks of the basic code block B that includes the prior block A;
   based on identifying a set of subtrees rooted at one of the predecessor blocks and having one or more open edges to one or more basic code blocks absent from the open tree, wherein the one or more open edges includes the open edge AC, connect each of the one or more open edges to the flow block F1 in the reconverging control flow graph, wherein connecting each of the one or more open edges to the flow block F1 comprises creating the edge AF;
   identify a set of one or more visited successor blocks N connected to the basic code block B via one or more backward outgoing edges; and
   in response to determining that a set of subtrees rooted in the set of successor blocks N has open outgoing edges to one or more basic code blocks absent from the open tree, connect each of the open outgoing edges to a newly created flow block F2.

* * * * *